(12) United States Patent
Levy et al.

(10) Patent No.: US 11,423,897 B1
(45) Date of Patent: *Aug. 23, 2022

(54) TECHNIQUES FOR PROVIDING ADAPTIVE RESPONSES

(71) Applicant: Amazon Technologies, Inc., Seattle, WA (US)

(72) Inventors: Ran Levy, Givatayim (IL); Ori Rozen, Tel Aviv (IL); Leon Portman, Givatayim (IL); Knaan Ratosh, Tel Aviv (IL); Ido Arad, Kfar Saba (IL); Hadar Neumann, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 16/777,082

(22) Filed: Jan. 30, 2020

(51) Int. Cl.
| | |
|---|---|
| *G10L 15/22* | (2006.01) |
| *G10L 15/18* | (2013.01) |
| *G10L 15/06* | (2013.01) |
| *G06N 3/04* | (2006.01) |
| *G06N 3/08* | (2006.01) |
| *G10L 15/04* | (2013.01) |

(52) U.S. Cl.
CPC ............ *G10L 15/22* (2013.01); *G06N 3/0454* (2013.01); *G06N 3/08* (2013.01); *G10L 15/04* (2013.01); *G10L 15/063* (2013.01); *G10L 15/1815* (2013.01); *G10L 2015/223* (2013.01)

(58) Field of Classification Search
CPC ....... G10L 15/22; G10L 15/04; G10L 15/063; G10L 15/1815; G10L 2015/223; G06N 3/0454; G06N 3/08

See application file for complete search history.

(56) References Cited

U.S. PATENT DOCUMENTS

| | | | | |
|---|---|---|---|---|
| 7,213,027 | B1 * | 5/2007 | Kominek | G06F 16/957 |
| 10,504,050 | B1 * | 12/2019 | Rogynskyy | G06F 16/27 |
| 10,565,498 | B1 * | 2/2020 | Zhiyanov | G06N 7/005 |
| 11,050,700 | B2 * | 6/2021 | Roller | G06F 40/295 |
| 2009/0157749 | A1 * | 6/2009 | Lessing | G06Q 10/063 |
| 2011/0054900 | A1 * | 3/2011 | Phillips | G10L 15/30 |
| | | | | 704/235 |

(Continued)

OTHER PUBLICATIONS

U.S. Appl. No. 16/439,388, "Techniques To Provide Adaptive Feedback," filed Jun. 12, 2019.

*Primary Examiner* — Michael Colucci
(74) *Attorney, Agent, or Firm* — Kilpatrick Townsend & Stockton LLP

(57) ABSTRACT

Systems and methods are described herein for generating an adaptive response to a user request. Input indicative of a user request may be received and utilized to identify an item in an electronic catalog. Title segments may be identified from the item's title. Significant segments of the user request may be determined. In response to the user request, a shortened title may be generated from the identified title segments and provided as output at the user device (e.g., via audible output provided at a speaker of the user device, via textual output, or the like). At least one of the title segments provided in the shortened title may correlate to the significant segment identified from the user request. In some embodiments, the length and content of the shortened title may vary based at least in part on the contextual intent of the user's request.

19 Claims, 14 Drawing Sheets

(56) References Cited

U.S. PATENT DOCUMENTS

| | | |
|---|---|---|
| 2016/0180247 A1 | 6/2016 | Li et al. |
| 2019/0005575 A1 | 1/2019 | Zeldin et al. |
| 2019/0034994 A1 | 1/2019 | Wu et al. |
| 2019/0295531 A1 | 9/2019 | Rao et al. |
| 2019/0392082 A1* | 12/2019 | Bell ....................... G06N 20/00 |
| 2020/0089800 A1* | 3/2020 | Bhojwani ............... G06F 16/23 |
| 2021/0004437 A1* | 1/2021 | Zhang ..................... G06N 5/04 |

* cited by examiner

US 11,423,897 B1

TECHNIQUES FOR PROVIDING ADAPTIVE RESPONSES

BACKGROUND

It has become commonplace for users to utilize audio input to interact with various devices (e.g., a smart speaker, a smart phone, or the like). By way of example, a user can speak one or more words to cause a smart speaker to search for an item in an electronic catalog, to reorder a previously purchased item, or the like. In some cases, the input (e.g., audible input, textual input, etc.) may include one or more terms that have heightened significance to the user (e.g., the word "gluten," "fat free," etc.). Some smart devices may be configured to provide audible output in response to a vocal request. The smart device may provide output that includes more information than is necessary or the output could lack enough information to enable the user to decipher whether the operations were carried out and/or particulars of the operations performed. This output may lack any indication that significant terms of the input were identified and/or utilized. This can lead to confusion for the user and/or inadvertent errors in device performance. The user can lose faith that the system understood the request correctly. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
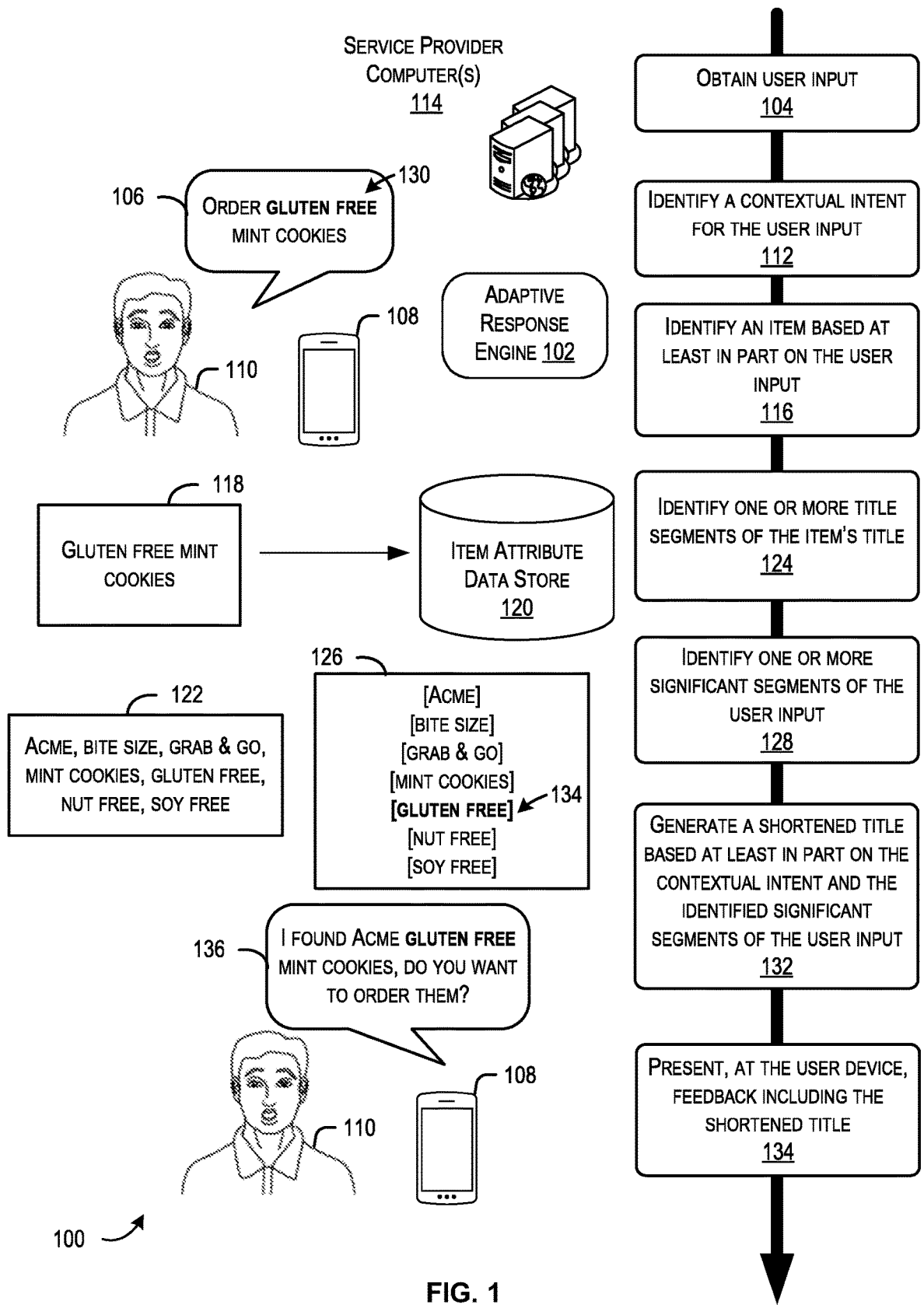
FIG. 1 illustrates an example flow for providing an adapted response utilizing an adaptive response engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to an adaptive response engine that may be utilized to generate a response suited for a particular purpose (e.g., to provide audible, textual, and/or other response data for a particular type of user request having a particular contextual intent and/or to provide response data that includes significant words/phrases of the user request). As used herein, a "contextual intent" of a request may be an intent of a user (e.g., to search an electronic catalog for data, to reorder an item from the electronic catalog, to purchase an item from an electronic catalog, and the like) that is inferred based on the context in which the request was made (e.g., the words/phrases used in the request, past purchase history, past searches, or any suitable data associated with the user and/or a group of users that are similar to the user). In some embodiments, the adaptive response engine may operate as part of a computerized personal assistant service provided by the service provider which can be accessed by vocal commands provided at a user device (e.g., a smart speaker, a smart phone, a mobile phone, etc.). Some input that may be provided at the user device may relate to an item offered in an online electronic catalog and/or an item associated with a user account corresponding to the online electronic catalog.

In some embodiments, the user may provide a input (e.g., "reorder gluten-free cookies") to cause a user device to perform operations related to an item (e.g., an item offered in an electronic online catalog). In some embodiments, the input can be provided audibly and/or textually. The item may be associated with a title (e.g., "Acme, bite size, grab & go, double mint cookies, gluten free, nut free, soy free. $4.99"). In some embodiments, the title can be lengthy and may include many terms that are not necessarily important to the user with respect to the contextual intent of the input. Additionally, the input may include significant segments (e.g., "gluten-free") that may be more significant to the user than others segments of the request. As used herein, a "segment" may generally include one or more words and/or phrases (e.g., one or more words and/or phrases of the input, one or more words and/or phrases of a title, etc.). To customize the response data provided in response to the input, a shortened title may be generated that is shorter than the original title of the item and includes terms of the title that were deemed to be related to the significant segments of the input (e.g., "Acme gluten-free mint cookies"). The particular length (e.g., short, medium, long) of the shortened title may depend on the contextual intent of the request (e.g., is the user buying, reordering, canceling an order, etc.). The shortened title may be provided as response data indicating particular operations were performed in response to the request (e.g., "You have reordered Acme gluten-free mint cookies."). Utilizing the techniques disclosed herein, confusion may be avoided and the user may be assured that the significant segments included in their request were utilized when performing operations associated with the request. Additionally, the user's confidence that the system understood the user's input correctly may be increased.

According to some embodiments, the user may provide input which is received as sound or textual data at the user device (e.g., via a microphone or keyboard of the user device). The input (e.g., sound data or textual data) may indicate to a user request (e.g., "buy gluten free cookies," "cancel my dog food order," "where's my order?", "what are my deals?", "is my watch waterproof?", etc.). The input may be converted to text format if not directly provided as text. The adaptive response engine may be utilized to identify a contextual intent for the user input. Hereinafter, "user input" may refer to vocal input, textual input, and/or vocal input as converted to text. In some embodiments, a number of tokens of the user request may be identified using any suitable lexical analysis algorithm. A token may include a word or a number. One or more tokens may be utilized to identify a particular contextual intent from a set of possible contextual intents. In some embodiments, a predetermined mapping may be utilized to determine that at least one token of the user request is associated with (e.g., mapped) to a particular contextual intent (e.g., a buy intent, a search intent, a cancel order intent, a reorder intent, a product information query intent, a deals intent etc.). In some embodiments, the contextual intent of a particular user request may be identified utilizing regular expressions and/or any named entity recognition techniques (e.g., an algorithm that takes a string of text as input and is configured to identify relevant nouns or other components within the text). to identify whether a matching token is included in the input. For example, the adaptive response engine may identify that a phrase including more than one token beginning with "my" is present in the user input. As another example, user input such as "what are the deals today?" may be identified as having a deals intent based at least in part on the token "deals" being included in the request. In some embodiments, one or more segments may be generated from the tokens of the user input. A segment may include one or more tokens in the same order as provided in the input data (e.g., user input, item information, etc.). When the input data is provided by the user (e.g., via a vocal request) the segments may be referred to as "input segments." In some embodiments, a machine learning model (e.g., a segmentation model) may be trained to identify segments of input data (e.g., segments of user input, segments of an item's title, segments of an item review, etc.). In some embodiments, the machine learning model may be trained utilizing a training set including one or more examples (e.g., user input, titles, reviews, item descriptions, etc.) for which corresponding segments are already known. The machine learning model may be trained utilizing any suitable machine-learning techniques (e.g., supervised learning techniques, regression analysis, classification algorithms, etc.). In some embodiments, the machine learning model is an artificial neural network (e.g., a feed forward artificial neural network). As another example, the input data may include item information such as item attributes (e.g., brand, dimensions, color, flavor, ingredients, etc.), reviews, questions and answers associated with the item, or any suitable information related to an item. For example, the input data may include historical items with which a user has interacted (e.g., purchased, browsed, returned, etc.). When the input data is historical item information, the segments derived from such data (e.g., segments identified by the segmentation model) may be referred to as "historical segments." The same (or a different) segmentation model may be trained in a similar manner as described above with example sets of item information for which segments have been manually identified. In some embodiments, the training data set used to train the segmentation model may include examples of both user input and various item information such that the model may be trained to identify segments within any corresponding type of input data. The training data set may further include any suitable information such as the contextual intent and/or user data such as past purchase history, browsing history, and the like.

One or more significant segments may be selected from the segments identified. A "significant segment" may refer to a segment of input data (e.g., current or historical user input, historical user data, item attributes, item reviews, or the like) that has a heightened significance with respect to other input segments of the input data. In some embodiments, the one or more significant segments of the user input may be identified by comparing words of an input segment to a predefined list of words/phrases. In some embodiments, each segment of input data (e.g., current and/or historical user input) may be treated as a "significant segment." As another example, a machine-learning model (e.g., a significant segment model) may be trained utilizing any suitable machine-learning techniques (e.g., supervised learning techniques, regression analysis, classification algorithms, clustering analysis, etc.) to identify one or more significant segments from a set of input segments. In some embodiments, significant segments can have varying degrees of significant. For example, in some embodiments the training data set may identify different significant scores for significant segments previously identified from a set of segments. The machine-learning model may be trained utilizing a training data set including example sets of segments and corresponding sets of significant segments (and their corresponding significance scores) that have been manually identified for each example set of segments. That is, particular input segments may be flagged as being more significant than other input segments of an example set of segments, for example, by human reviewers. In some cases, some significant segments may be deemed more or less significant than other significant segments. Alternatively, or in addition, significant segments may be identified utilizing one or more unsupervised machine learning techniques, for example, significant segments may be identified as corresponding to clusters in a significance feature space. The training data set may include any suitable information such as the contextual intent and/or user data such as past purchase history, browsing history, and the like from which one or more items may be identified and one or more corresponding segments may be identified (e.g., from the one or more item titles, item descriptions, item reviews, and/or segments identified from any suitable data associated with the one or more items). Some of these segments may also be identified as significant segments in the training data set. As yet another example, the training data set may include historical user input (e.g., the user's past queries) for which segments and signficiant segments have previously been identified).

Once trained, the model may be provided a set of segments (e.g., segments identified by the segmentation model) as input and provide, as output, a set of significant segments identified from the input. In other embodiments, each word of a segment may be compared to a set of predefined words. If a word of a segment matches a word from the set of predefined words, the input segment may be considered to be a "significant segment." In some embodiments, the adaptive response engine can associate significant segments with a label or other indicator to indicate the particular segment has been identified as a significant segment. The segments and these associations may be stored for subsequent use. It should be appreciated that any identification of a segment (e.g., a title segments, segments determined from an item attribute, a significant segment identified from item attributes of the items the user has historical interacted with (e.g., purchased, browsed, placed in a shopping cart, etc.), previous user input, and the like may be performed as part of an offline process. Thus, in some embodiments, the segments and/or significant segments of historical data may already be determined and associated with the user and/or an item. By performing this offline process, the system can increase the efficiency of the system at run time.

In some embodiments, user input may relate to a particular item associated with the electronic catalog. In some embodiments, a search query may be generated from the user input and executed against a database including items of an electronic catalog. An item may be identified from the search results (e.g., a highest scored item, an item deemed to be most pertinent to the search query, etc.). In still further embodiments, the adaptive response engine may utilize multiple sources of data (e.g., a database of items offered in an electronic catalog, historical user data identifying items previously associated with a user, etc.) from which an item may be identified. In some embodiments, the sources of data utilized to search for an item may be selected based on the contextual intent of the user request. For example, if the contextual intent is "reorder," the item may be identified from items referenced in user account data associated with the requestor. User account data may include any suitable data associated with the user account such as purchase history, browsing history, reoccurring orders/subscriptions data associated with the user account, and the like. As a non-limiting example, user input such as "reorder my dog food" may be identified as having a reorder intent based at least in part on determining that the token "reorder" is included in the user request and/or due to the tokens "my dog food" being included in the user request in conjunction with identifying that the user has ordered dog food in the past (e.g., as determined from historical purchase history associated with the user account). When the user request is identified as having a "reorder" contextual intent, the search query generated from the request may be executed against the user account data associated with user to identify an item related to the request. As another example, when the user request is identified as having a "buy" contextual intent, the search query generated from the request may be executed against a search index (e.g., a database, a collection, a corpus, etc.) of items included in the electronic catalog. A predetermined mapping may be maintained to identify what source(s) to search for an item related to the request based on the contextual intent identified for the request. In some embodiments, when user account data and the electronic catalog are search, items corresponding to the search query found from the user account data may take precedence over items found within the electronic catalog.

Upon identifying an item and the contextual intent of the user request, the adaptive response engine may obtain a particular attribute of the item, such as the title of the item. The title may include any suitable text including, but not limited to, alphanumeric characters, symbols, punctuation marks, and the like. In some embodiments, the title of an item may be relatively long and may include segments that correspond to differing attributes of the item. In some embodiments, the title of the item may be provided as input to the segmentation model described above to identify segments of the title (e.g., hereinafter referred to as a "title segments"). In some embodiments, the training data set for the segmentation model may include, for each identified segment of a title, a particular attribute type of the item (e.g., brand, product type, price, pack size, dimensions, etc.) to which the item relates. Thus, in some embodiments, in addition to identifying segments of a title, the segmentation model may further identify one or more item attribute types to which a given segment relates. As described herein, the identification of these segments and/or item attribute types may be identified offline as part of a preprocessing effort.

As another non-limiting example, title segments may be identified by identifying phrases based on punctuation marks. By way of example, a title may include one or more title segments delineated by a "comma" between each title segment. For example, an item may have a title such as "Acme, bite size, grab & go, double mint cookies, gluten free, nut free, soy free, $4.99" may be segmented into title segments based at least in part on punctuation marks. Each of the resulting title segments may be compared to a predefined list of words/phrases that have already been mapped to particular item attribute types. If one or more matches is determined, the title segment may be associated with the corresponding item attribute type. In some embodiments, this process may be performed offline (e.g., prior to runtime, prior to receipt of the user input, etc.).

In either scenario, continuing with the example title from above, "Acme" may be considered a title segment corresponding to the item's brand. "Bite size" may be considered another title segment which relates to the item's size. "$4.99" may be considered another title segment relating to the item's price. The title segments "grab & go," "gluten free," "nut-free," and "soy-free" may be identified (e.g., based on punctuation marks of the title) but may be identified as not relating to any particular item attribute. It may be the case that some title segments may be determined not to relate to any of a previously defined list of item attribute types. In such cases, a default value may be associated with those title segments or those title segments may simply lack an association to any of the known item attribute types.

The adaptive response engine may execute a correlation method in which one or more title segments of item's title are correlated to a significant segment identified from the user request. In some embodiments, the words (and/or synonyms) of the significant segment may be compared to the words of the title segments to identify a title segment (or title segments) that include a word (or synonym of the word) of the significant segment. If a title segment is determined to include a word (or synonym of the word) of the significant segment, then the title segment may be associated with a label that indicates it is associated with a significant segment.

In at least one embodiment, the correlation method may include utilizing a machine-learning model (e.g., a correlation model) that has been previously trained to identify when a title segment corresponds to a significant segment. In some embodiments, the correlation model may be trained utilizing any suitable supervised learning techniques and a training set. The training set may include training examples each including a set of title segments of an item, a set of one or more significant segments (e.g., identified from user input), and a set of one or more indicators (e.g., any suitable label)

that indicates which title segments correspond to a significant segment. Once trained, the correlation model may be provided a set of title segments and a set of significant segments and may return as output indicating which title segments (if any) correspond to a significant segment. For example, the correlation model may output a subset of the title segments provided as input that were determined to correspond to a significant segment provided as input.

In some embodiments, the adaptive response engine may consult a predefined mapping of types of shortened title types (e.g., long, medium, short) to corresponding contextual intents (e.g., buy intent, reorder intent, cancel intent, etc.) in order to identify a type of shortened title to be utilized when providing a response to the user request. By way of example, the mapping may indicate that a response to a user request that is identified as having the contextual intent to buy an item (e.g., buy intent) is to utilize a long title, while a response to a user request that is identified as having a different contextual intent (e.g., reorder intent, cancel intent, etc.) is to utilize a shortened title of a different type (e.g., a medium title, a short title, etc.). It should be appreciated that a type associated with a shortened title may refer to a title length (e.g., as measured in words, terms, tokens, segments, etc.) and/or the type may refer to a selection protocol to be utilized to generate the shortened title (e.g., a set of predetermined selection rules associated with generating a long title, a different set of predetermined selection rules associated with generating a short title, etc.). The adaptive response engine may generate a shortened title of the prescribed type according to the selection protocol (or portion of the selection protocol) associated with that type.

In some embodiments, another machine-learning model (e.g., a selection model) may be trained to select segments for a shortened title utilizing training examples individually including a title, the title segments of the title, and an ideal title (e.g., a combination of one or more of the title segments) that has been manually identified. The adaptive response engine may provide the shortened title as part of a response provided at the user device.

In some embodiments, the selection protocol and/or the selection model used to generate the shortened title may cause title segments corresponding to significant segments of the user request to be preferred over other segments (e.g., title segments corresponding to an item attribute type, title segments that do not correspond to an item attribute type, etc.). In some embodiments, a significance scores of each significant segment (e.g., identifying a degree of significance) corresponding title segments can be used to prioritize at least one title segment over another based at least in part on their corresponding significant segment's significance score. It may be the case that the selection protocol and/or model may cause title segments corresponding to an item attribute type to be preferred over title segments that do not correspond to an item attribute type, title segments corresponding to one or more specific item attribute type(s) to be preferred over title segments corresponding to other item attribute types or title segments that do not correspond to an item attribute type.

By utilizing the techniques provided herein, responses may be provided which are adapted/customized based on the context/intent of the user's input. Significant segments of the user input may be identified and utilized to fulfill the request. It may be that a person who is requesting to buy an item may desire to be provided more item details (e.g., corresponding to a longer title) than someone who is canceling, because a person cancelling an order is already familiar with the item due to their previous purchase of the item. Accordingly, the information provided in the title of an item may be more informative (e.g., lengthier) when the context indicates a buy intent than when the context indicates a cancel order intent. The system may further ensure that the shortened title include information corresponding to the significant segments identified from the request. This may improve the user's experience as the amount of information provided in response to a request is tailored to include information that is helpful for that type of request and which reinforces to the user that significant features of the request were taken into account when fulfilling the request. Accordingly, the user can avoid being inundated with superfluous information that does not aid him in his task. The techniques described herein may further reduce the likelihood of confusion and/or of executing operations that the user did not intend.

Moving on to FIG. 1 which illustrates a flow 100 for providing an adapted response utilizing an adaptive response engine 102, in accordance with at least one embodiment. The flow 100 depicts an example in which an adapted response is provided in response to user input related to an item provided in an electronic catalog.

The flow 100 may begin at 104, where user input 106 may be obtained at a user device (e.g., the user device 108). The user device 108 may be depicted as a mobile phone, but it should be appreciated that other devices (e.g., a smart speaker, a smart watch, a PDA, etc.) may be utilized. As a non-limiting example, the user 110 may vocally provide the statement "order gluten free mint cookies" which can be received as sound input by an input device (e.g., a microphone) of the user device 108. Although sound data/vocal input are used in a variety of examples herein, it should be appreciated that similar techniques may be utilized using data of other formats (e.g., textual data). In some embodiments, the user input 106 (if vocal) may be converted (e.g., by the user device 108, by the adaptive response engine 102, etc.) to textual format at any suitable time utilizing any suitable speech-to-text algorithm. Accordingly, the user input 106 may be converted data in subsequent steps of the flow 100.

At 112, a contextual intent for the user input 106 may be identified by the adaptive response engine 102. As used herein a "contextual intent" (also referred to herein as "intent" or "conversational context") is intended to refer to an indication of the user's intent with respect to providing the user input 106. For example, the user's input may be indicative of an attempt to purchase an item, a task which may be associated with a buy intent (a type of contextual intent). To identify the contextual intent of the user input 106, the user input 106 may be tokenized by the adaptive response engine 102. The adaptive response engine 102 may execute in whole or in part at the user device and/or at the service provider computer(s) 112. The adaptive response engine 102 may identify a number of tokens (e.g., words, strings of characters, etc.) from user input 106. The tokenization of the user input 106 may utilize any suitable lexical analysis algorithm. In some embodiments, a contextual intent protocol set (e.g., one or more predetermined rules) may be utilized to determine the contextual intent of the user input 106 based at least in part on these tokens (e.g., words, numbers, etc.) and/or combinations of tokens (e.g., phrases). By way of example, the contextual intent protocol set (or contextual intent protocol for brevity) may specify particular words, phrases, regular expressions and the like as being associated with (e.g., mapped) to a particular contextual intent (e.g., a buy intent, a cancel order intent, a reorder intent, etc.).

At 116, an item may be identified (e.g., by the adaptive response engine 102 or another suitable system) based at least in part on some portion of the user input 106. By way of example, a query 118 (derived from user input 106) may be submitted to an item attribute data store 120 (e.g., a database of items offered from an electronic catalog) to identify one or more items corresponding to the query 118. Although the item attribute data store 120 is used as an example, it should be appreciated that other data sources may be alternatively or additionally search (e.g., based at least in part on the contextual intent identified at 112). In some embodiments, the query 118 may be derived by removing words, terms, and/or phrases that correspond to a predetermined list of words, terms, phrases, and/or regular expressions. In some embodiments, a particular item may be selected based at least in part a degree to which the item relates to the query (e.g., a relevancy score) and/or browsing history of the user, purchase history of the user, user preferences, etc. associated with a user account (e.g., a user account maintained by a provider of the electronic catalog). In some embodiments, more than one item may be returned by executing the query 118 and one or more items having the highest relevancy score(s) may be selected. For each item identified, the adaptive response engine 102 may obtain a particular attribute of the item, such as the item title 122. Item title 124 may include any suitable text including, but not limited to, alphanumeric characters, symbols, punctuation marks, and the like. In some embodiments, the title of an item may be relatively long and may include segments that correspond to differing attributes of the item. By way of example, item title 124 may include "Acme, bite size, grab & go, mint cookies, gluten free, nut free, soy free".

At 124, a machine-learning model (e.g., the title segment model 401 discussed in connection with FIG. 4A, an example of a segmentation model discussed herein) may be utilized to identify one or more title segments of item title 122. By way of example, title segments 126 may be identified by the machine-learning model from the item title 122. As discussed herein, in some embodiments, the one or more title segments of item title 122 may have been previously identified during offline processing and associated with the item such that these segments may be simply retrieved at 124.

At 128, the same, or a different machine-learning model (e.g., the significant segment model 421 discussed in connection with FIG. 4B, also an example of a segmentation model discussed herein) may be utilized to identify one or more significant segments from the user input 106. In some embodiments, every segment of the user input 106 may be deemed to be a significant segments. In other embodiments, the significant segment 130 may be identified from the user input 106. In some embodiments, the significant segment 130 may be identified based at least in part on comparing the words/phrase of an input segment (e.g., "gluten free") to a predefined list of significant words/phrases. If the words/phrase of the input segment matches one of the words/phrases of the predefined list, that input segment may be labeled or otherwise identified as a significant segment.

At 132, a shortened title may be generated (e.g., from the title segments 126) based at least in part on the contextual intent identified at 112 and the identified significant segments (e.g., significant segment 130). In some embodiments, the title segment 134 may be compared to the significant segment 130 to determine whether the title segment 134 corresponds to the significant segment 130. In some embodiments, a machine-learning model (e.g., the correlation model 441 discussed in connection with FIG. 4C) may be utilized to identify one or more title segments (e.g., the title segment 134) that correspond to the significant segment 130.

In some embodiments, the adaptive response engine 102 may maintain a mapping that identifies associations between a particular contextual intent (e.g., buy, reorder, cancel, etc.) and a particular type of shortened title (e.g., short, medium, long). Each type of shortened title may be associated with a corresponding set of predetermined rules (e.g., a "selection protocol") that specifies the manner in which particular segments are to be selected (e.g., to generate a shortened title) from a set of segments of a title (e.g., the title segments 126). In some embodiments, a selection protocol may specify that the shortened title include all title segments that were identified as corresponding to any significant segment of the user input 106 (e.g., the significant segment 130).

As another example, another machine-learning model that has been previously trained to identify shortened titles from input titles may be utilized. In some embodiments, this machine-learning model (referred to as a "selection model") may be separate from the other machine-learning models discussed herein. The selection model may be trained (by the adaptive response engine 102 or another suitable system) based at least in part on supervised learning techniques and a training data set including any suitable number of titles for which ideal shortened title (or ideal shortened titles that individually correspond to each type of contextual intent) has been predefined. In some embodiments, a single selection model may be trained to identified shortened titles based on the contextual intent or different selection models corresponding to differing contextual intents may be trained. As described herein "a selection protocol" is intended to include any suitable combination of a set of predefined rules for generating a shortened title and/or a selection model. The selection protocol may cause particular segments related to particular item features and/or significant segments of the user input to be selected and arranged in a particular order to generate the shortened title.

At 134, response 136 may be presented at the user device 108 based at least in part on the selected segments. It should be appreciated that the response 136 may be textual and/or audible. In some embodiments, the response 136 may include the shortened title generated at 132 which includes the title segments that were determined to correspond to the significant segments identified from the user input 106. As another example, one or more significant segments may be presented (e.g., textually) in addition to the shortened title as part of the response 136. The response 136 may be provided textually and/or audibly. If provided audibly, the response may be converted from text to sound (e.g., by the adaptive response engine 102, by the user device 108, etc.) utilizing any suitable text-to-speech algorithm.

Figure 2:
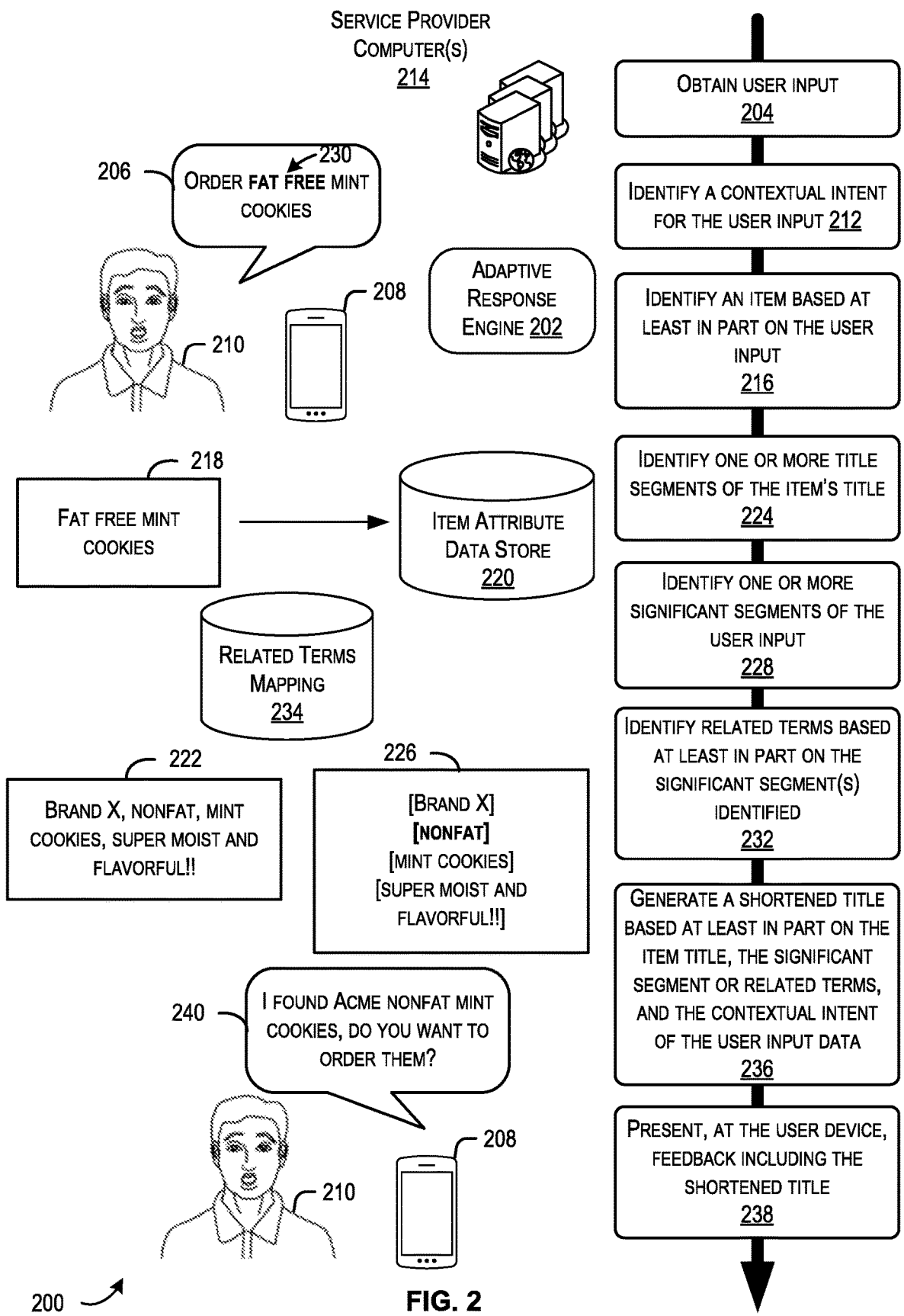
FIG. 2 illustrates another example flow for providing an adapted response utilizing an adaptive response engine, in accordance with at least one embodiment.

FIG. 2 illustrates another example flow 200 for providing adapted response utilizing an adaptive response engine, in accordance with at least one embodiment. The flow 200 depicts an example in which related terms are identified for the user input and utilized to generate adaptive response in response to a user request.

The flow 200 may begin at 204, where user input 106 may be obtained at a user device 208 (an example of the user device 108 of FIG. 1). As a non-limiting example, the user 210 may vocally provide the statement "order fat free mint cookies" which can be received as sound input by an input device (e.g., a microphone) of the user device 208. In some embodiments, the user input 206 (if vocal) may be converted (e.g., by the user device 208, by the adaptive response engine 202 (an example of the adaptive response engine 102 of FIG. 1), etc.) to textual format at any suitable time utilizing any suitable speech-to-text algorithm. Accordingly, the user input 206 may be converted data in subsequent steps of the flow 200.

At 212, a contextual intent for the user input 206 may be identified by the adaptive response engine 202. To identify the contextual intent of the user input 206, the user input 206 may be tokenized by the adaptive response engine 202. The adaptive response engine 202 may execute in whole or in part at the user device and/or at the service provider computer(s) 214 (an example of the service provider computer(s) 112 of FIG. 1). The adaptive response engine 202 may identify a number of tokens (e.g., words, strings of characters, etc.) from user input 206. The tokenization of the user input 206 may utilize any suitable lexical analysis algorithm. In some embodiments, a contextual intent protocol set (e.g., one or more predetermined rules) may be utilized to determine the contextual intent of the user input 206 based at least in part on these tokens (e.g., words, numbers, etc.) and/or combinations of tokens (e.g., phrases). By way of example, the contextual intent protocol set (or contextual intent protocol for brevity) may specify particular words, phrases, regular expressions and the like as being associated with (e.g., mapped) to a particular contextual intent (e.g., a buy intent, a cancel order intent, a reorder intent, etc.).

At 226, an item may be identified (e.g., by the adaptive response engine 202 or another suitable system) based at least in part on some portion of the user input 206. By way of example, a query 218 (derived from user input 206) may be submitted to an item attribute data store 220 (e.g., a database of items offered from an electronic catalog) to identify one or more items corresponding to the query 218. Although the item attribute data store 220 is used as an example, it should be appreciated that other data sources may be alternatively or additionally search (e.g., based at least in part on the contextual intent identified at 212). In some embodiments, the query 218 may be derived by removing words, terms, and/or phrases that correspond to a predetermined list of words, terms, phrases, and/or regular expressions. In some embodiments, a particular item may be selected based at least in part a degree to which the item relates to the query (e.g., a relevancy score) and/or browsing history of the user, purchase history of the user, user preferences, etc. associated with a user account (e.g., a user account maintained by a provider of the electronic catalog). In some embodiments, more than one item may be returned by executing the query 218 and one or more items having the highest relevancy score(s) may be selected. For each item identified, the adaptive response engine 202 may obtain a particular attribute of the item, such as the item title 222. Item title 222 may include any suitable text including, but not limited to, alphanumeric characters, symbols, punctuation marks, and the like. In some embodiments, the title of an item may be relatively long and may include segments that correspond to differing attributes of the item. By way of example, item title 222 may include "Brand X, nonfat, mint cookies, super moist and flavorful!!".

At 224, a machine-learning model (e.g., the title segment model 401 discussed in connection with FIG. 4A, an example of a segmentation model discussed herein) may be utilized to identify one or more title segments of item title 222. By way of example, title segments 226 may be identified by the machine-learning model from the item title 222 provided as input. As described herein, the identification of the one or more title segments of the item title 222 may be performed as part of preprocessing operations since the item title 222 may be known prior to runtime.

At 228, one or more significant segments of the user input 206 may be identified. In some examples, every segment of the user input may be deemed to be a significant segment. In other examples, a segmentation protocol (e.g., a predefined set of segmentation rules, or a machine-learning model such as the significant segment model 421 discussed in connection with FIG. 4B, also an example of a segmentation model discussed herein) may be utilized to identify significant segment 230 from the user input 206. The user input 206 (or previously identified segments of the user input 206) may be provided to a segmentation model (e.g., the significant segment model 421) to identify the significant segment 230 from the user input 206. As another example, the significant segment 230 may be identified based at least in part on comparing the words/phrase of a segment identified from the user input 206 (e.g., "fat free") to a predefined list of significant words/phrases. If the words/phrase of the input segment matches one of the words/phrases of the predefined list, that segment may be labeled or otherwise identified as a significant segment.

At 232, the significant segment(s) identified at 228 (e.g., "fat free" of significant segment 230) may be utilized to identify a set of related terms. By way of example, the related terms mapping 234 may include a mapping of segment terms to one or more known synonyms. By way of example, the related terms mapping 234 may be consulted to identify that "fat free" from significant segment 230 may be associated with a synonym "nonfat."

At 236, a shortened title may be generated (e.g., from the title segments 126) based at least in part on the item title 222, the significant segment 230 and/or the related terms identified at 232, and contextual intent identified at 212. In some embodiments, the title segments 226 may be compared to the significant segment 230 or related terms to determine which of the title segments 226 corresponds to the significant segment 230. If a title segment is determined to correspond to a related term identified at 232, then the title segment may be considered to relate to the significant segment 230. In some embodiments, a machine-learning model (e.g., the correlation model 441 discussed in connection with FIG. 4C) may be utilized to identify one or more title segments (e.g., the title segment 134) that correspond to the significant segment 130 (or the related terms identified at 232). By utilizing the related terms identified at 232, the adaptive response engine 202 may ensure that title segments that have a similar meaning as the significant segments of the user request are included in the shortened title.

In some embodiments, the adaptive response engine 202 may maintain a mapping that identifies associations between a particular contextual intent (e.g., buy, reorder, cancel, etc.) and a particular type of shortened title (e.g., short, medium, long). Each type of shortened title may be associated with a corresponding set of predetermined rules (e.g., a "selection protocol") that specifies the manner in which particular segments are to be selected (e.g., to generate a shortened title) from a set of segments of a title (e.g., the title segments 226). In some embodiments, a selection protocol may specify that the shortened title include all title segments that were identified as corresponding to any significant segment of the user input 206 (e.g., the significant segment 230).

As another example, another machine-learning model that has been previously trained to identify shortened titles from input titles may be utilized. In some embodiments, this machine-learning model (referred to as a "selection model") may be separate from the other machine-learning models discussed herein. The selection model may be trained (by the adaptive response engine 102 or another suitable system)

based at least in part on supervised learning techniques and a training data set including any suitable number of titles for which ideal shortened title (or ideal shortened titles that individually correspond to each type of contextual intent) has been predefined. In some embodiments, a single selection model may be trained to identified shortened titles based on the contextual intent or different selection models corresponding to differing contextual intents may be trained. As described herein "a selection protocol" is intended to include any suitable combination of a set of predefined rules for generating a shortened title and/or a selection model. The selection protocol may specify that particular segments related to particular item features are to be selected and arranged in a particular order to generate the shortened title. In some embodiments, the selection protocol may specify that selection of title segments may be based at least in part on significance score a corresponding significant segment. Because the significant segments of the user input could have varying significance scores, the selection protocol may be configured to utilize the significant scores of the corresponding significant segments when determining which title segments to select. For example, title segments corresponding to significant segments with relatively higher significance scores (e.g., the highest score(s), a score over a threshold, etc.) may be selected before title segments corresponding to significant segments with lower significant scores (e.g., scores that do not exceed the threshold).

At 238, response 240 may be presented at the user device 208 based at least in part on the selected segments. It should be appreciated that the response 240 may be textual and/or audible. In some embodiments, the response 240 may include the shortened title generated at 236 which includes the title segments that were determined to correspond to the related term ("nonfat") identified as being a synonym of the significant segment 230. As another example, the response 240 may include a shortened title and additionally one or more significant segments presented with (e.g., adjacent to) the title. Thus, even though the user 210 requested "fat free mint cookies" to be ordered, the response 240 may be equally informative to the user based at least in part on including the related term "nonfat." The response 240 may be provided textually and/or audibly. If provided audibly, the response 240 may be converted from text to sound (e.g., by the adaptive response engine 202, by the user device 208, etc.) utilizing any suitable text-to-speech algorithm.

Figure 3:
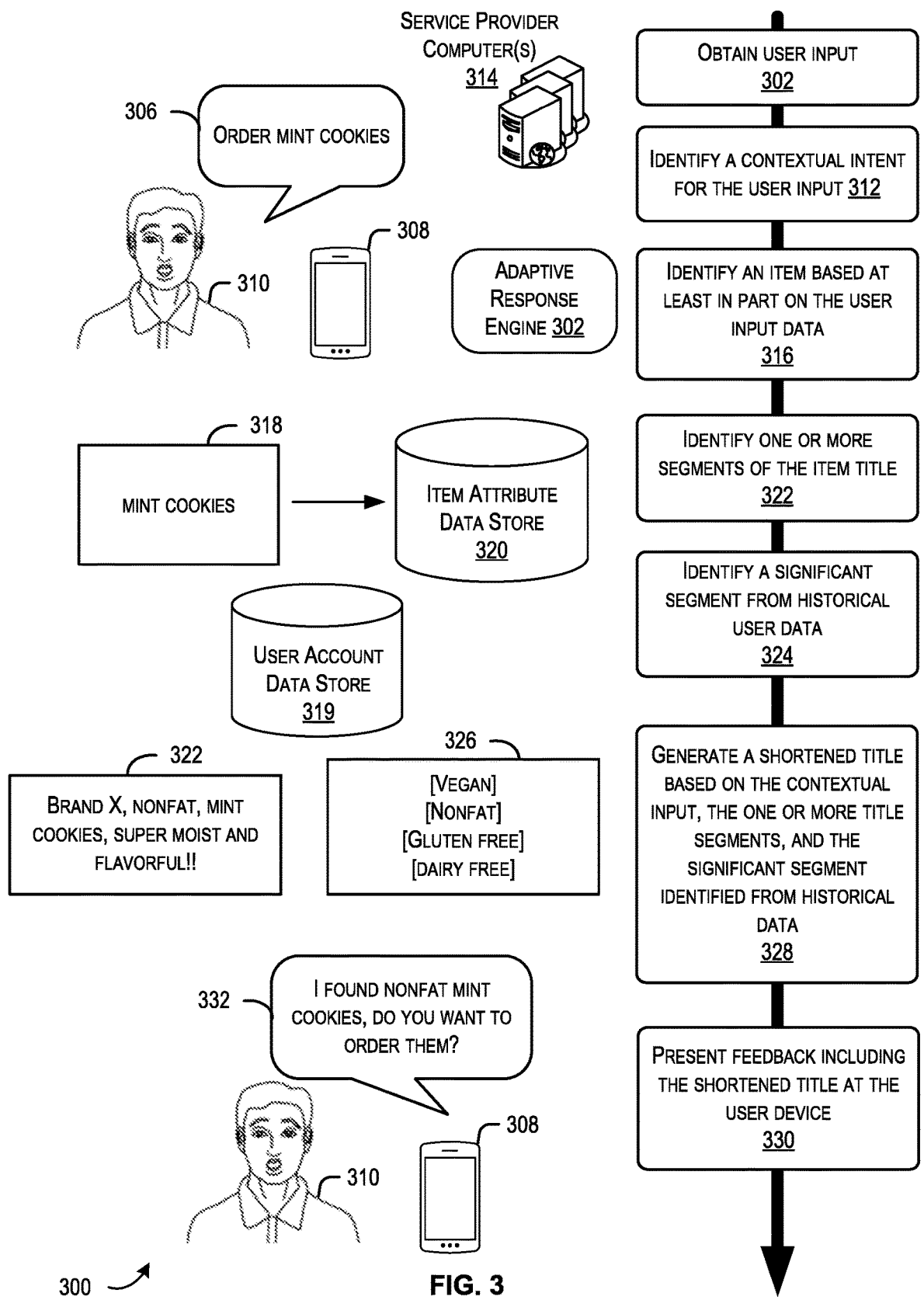
FIG. 3 illustrates yet another example flow for providing an adapted response utilizing an adaptive response engine, in accordance with at least one embodiment.

FIG. 3 illustrates yet another example flow 300 for providing adapted response utilizing an adaptive response engine, in accordance with at least one embodiment. The flow 300 depicts an example in which a significant segment may be identified from historical user data.

The flow 300 may begin at 302, where user input 306 may be obtained at a user device 308 (an example of the user device 108 of FIG. 1). As a non-limiting example, the user 310 may vocally provide the statement "order mint cookies" which can be received as sound input by an input device (e.g., a microphone) of the user device 308 and converted to textual (e.g., by the user device 308, by the adaptive response engine 302 (an example of the adaptive response engine 102 of FIG. 1), etc.) utilizing any suitable speech-to-text algorithm. Accordingly, the user input 306 may be converted data in subsequent steps of the flow 300.

At 312, a contextual intent for the user input 306 may be identified by the adaptive response engine 302 in a similar manner as discussed above in connection with FIGS. 1 and 2. The adaptive response engine 302 may operate, at least in part at the user device 308 and/or the service provider computer(s) 314.

At 316, an item may be identified (e.g., by the adaptive response engine 302 or another suitable system) based at least in part on some portion of the user input 306. By way of example, a query 318 (derived from user input 306) may be submitted to an item attribute data store 320 (e.g., a database of items offered from an electronic catalog) to identify an item corresponding to the query 318. Although the item attribute data store 320 is used as an example, it should be appreciated that other data sources may be alternatively or additionally search (e.g., based at least in part on the contextual intent identified at 312). If the contextual intent of the user input 306 was "reorder," the query 318 may be used to search user account data associated with the user and stored within user account data store 319. By way of example, item identifiers for past purchased items, items that were viewed by the user, items that were placed in a shopping cart, and the like, may be retrieved from the user account data and item information may be retrieved from the item attribute data store that corresponds to those item identifiers. In some embodiments, the query 318 may be executed against the item information obtained for the set of items identified from user account data rather than item information associated with every item in an electronic catalog.

At 322, a machine-learning model (e.g., the title segment model 401 discussed in connection with FIG. 4A, an example of a segmentation model discussed herein) may be utilized to identify one or more title segments of the title 322 of the item identified at 316. As discussed above, in some embodiments, the one or more title segments of the title 322 may be identified offline as part of preprocessing. In these cases the identified title segments may be associated with the item such that they may be retrieved at runtime rather than being identified at runtime. This can increase the efficiency of the system as a whole.

At 324, one or more significant segments of historical user data may be identified. In some embodiments, identifying one or more significant segments of the historical user data could be performed offline or at runtime. In some embodiments, a segmentation protocol (e.g., a predefined set of segmentation rules, or a machine-learning model such as the significant segment model 421 discussed in connection with FIG. 4B, also an example of a segmentation model discussed herein) may be utilized to identify significant segments from historical user data (e.g., offline, at runtime). By way of example, item identifiers for past purchased items, items that were viewed by the user, items that were placed in a shopping cart, and the like, may be retrieved from the user account data and item information may be retrieved from the item attribute data store that corresponds to those item identifiers. The item information may include any suitable data associated with an item such as an item identifier, an item description, any suitable number of item attributes (e.g., brand, dimensions, price, color, flavor, size, etc.), item reviews, questions and/or answers associated with the item, and the like. The item information may be provided to the segmentation model to identify one or more significant segments. In some embodiments, the item information for each item may be compared to the item information of other items to identify commonalities. As an example, if many items (over some threshold number of items) previously purchased by the user include "gluten free" in their respective titles, then "gluten free" may be identified as a significant segment. If a significant segment model is utilized, the significant segment model may be trained with any suitable supervised as discussed above with a training data set for which significant segments of item information have been manually identified.

As another example, the significant segment model may be trained utilizing an unsupervised machine-learning method to identify correlations between variables of item information training data. For example, the user account data may be provided as input to the significant segment model. An unsupervised machine-learning algorithm (e.g., a clustering algorithm, a classification algorithm, etc.) may be executed on the data to identify correlations between particular portions of the item information and interaction with the item by the user. Said another way, the unsupervised machine-learning algorithm may be utilized to identify that the user often interacts with items that have particular features (as determined from the item information). The significant segments 326 is intended to depict a set of significant segments identified at 324 utilizing any of the techniques discussed therein.

At 328, a shortened title may be generated from the title segments identified at 322 based at least in part on the significant segments 326 and the contextual intent identified at 312. In some embodiments, a machine-learning model (e.g., the correlation model 441 discussed in connection with FIG. 4C) may be utilized to identify one or more title segments (e.g., the title segment 134) that correspond to one or more of the significant segments 326. If a title segment is identified as corresponding to at least one of the significant segments 326, the title segment may be flagged as indicating the same. In some embodiments, if the significant segments 326 have significance score indicating a degree of significance with respect to one another, the corresponding title segment may also be associated with the significance score of its corresponding significant segment. A selection protocol (e.g., a predefined selection rule set and/or selection model) may be utilized to generate a shortened title based on the contextual intent identified at 312. The particular selection protocol utilized may be identified using the contextual intent (e.g., by consulting a mapping of contextual intents to identified selection protocols). In some embodiments, this selection protocol may ensure that title segments that correspond to at least one of the significant segments 326 is included in the shortened title. In some embodiments, the selection protocol may utilize the significance score associated with the title segment and/or the corresponding significant segment when determining which title segments to select.

As another example, another machine-learning model that has been previously trained to identify shortened titles from input titles may be utilized. In some embodiments, this machine-learning model (referred to as a "selection model") may be separate from the other machine-learning models discussed herein. The selection model may be trained (by the adaptive response engine 102 or another suitable system) based at least in part on supervised learning techniques and a training data set including any suitable number of titles for which ideal shortened title (or ideal shortened titles that individually correspond to each type of contextual intent) has been predefined. In some embodiments, the training data set may include the segments of each title and an indication that the segment corresponds to a significant segment (e.g., identified from user input and/or historical data). In some embodiments, a single selection model may be trained to identified shortened titles based on the contextual intent or different selection models corresponding to differing contextual intents may be trained. As described herein "a selection protocol" is intended to include any suitable combination of a set of predefined rules for generating a shortened title and/or a selection model. The selection protocol may specify that particular segments related to particular item features are to be selected and arranged in a particular order to generate the shortened title.

At 330, response 332 may be presented at the user device 308 based at least in part on the selected segments. It should be appreciated that the response 332 may be textual and/or audible. In some embodiments, the response 332 may include the shortened title generated at 328. Thus, even though the user 210 requested "mint cookies" to be ordered, the response may indicate to the user that his past preferences of ordering nonfat items was taken into account.

Figure 4A:
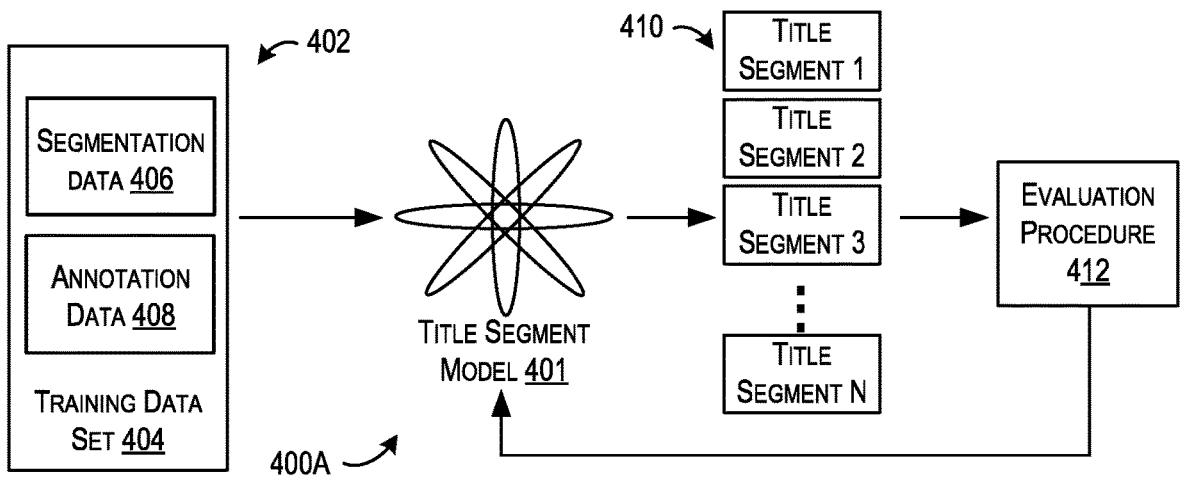
FIGS. 4A-4C individually include a flowchart illustrating an example method for training a machine-learning model, in accordance with at least one embodiment.

FIG. 4A includes a flowchart illustrating an example method 400A for training a segmentation model (e.g., the title segment model 401), in accordance with at least one embodiment. The method 400A may be performed by any of the adaptive response engines of FIGS. 1-3.

In some embodiments, the method 400A may begin at 402, where the adaptive response engine (or a component thereof) may obtain training data set 404. Training data set 404 may include any suitable data with which title segment model 401 may be trained to identify one or more segments from input data (e.g., a title associated with an item). By way of example, training data set 404 may include segmentation data 406 and, in some cases, attribute annotation data 408. Segmentation data 406 may include any suitable number of titles and corresponding sets of segments manually derived from the titles. In some embodiments, the segments may be specified in any suitable manner. By way of example, each of the tokens of a title may be provided sequentially as found in the title. A label of "1" (or another suitable value) may be utilized to indicate tokens that open (begin) a segment and a label of "0" (or another suitable value) may be utilized to indicate tokens that do not open a segment. The segments may be derived by starting with an opening token and concatenating each subsequently occurring token in the title between that opening token and the next opening token. As another example, a segment may be indicated using a set of tokens where deriving the segment as described above is unnecessary.

Attribute annotation data 408 may include attributes labels associated with each segment of a title (or in some cases each opening token) that indicates an association with an attribute type of an item. Attribute types may include, but are not limited to, brand (e.g., Acme), product type (e.g., mint cookies), size (e.g., size 4), pack size (e.g. pack of 60), specialty (e.g. sugar-free), length (e.g. 4 inches), weight (e.g. 60 pounds), volume (e.g. 100 gallons), flavor (e.g., spearmint), capacity (e.g. 32 GB), dimension (e.g. 5 inch×10 inch), power (e.g. 25 Watt), model (e.g. C2SA-YS02), product condition (e.g., refurbished), or any suitable category corresponding to an attribute type associated with the item.

It should be appreciated that not all segments of a title will be associated with an attribute label. It is contemplated that one or more segments may not correspond with any particular attribute type. Accordingly, these segments may include no associations to an attribute label or these segments could be associated with an attribute label that indicates the segment does not correspond with any of the previously specified item attributes.

In some embodiments, the segmentation data 406 and/or the attribute annotation data 408 may be predefined and/or any suitable combination of the segmentation data 406 and attribute annotation data 408 may be obtained from a crowdsourcing platform. A crowdsourcing platform is intended to refer to a system (or a component of the adaptive response engine) that is configured to provide one or more user interfaces with which a plurality of crowdsourcing platform users (sometimes called a crowd-sourced group of users) may review a title and manually identify segments of the title. In some embodiments, the training data set may be derived from a larger set of item data (e.g., titles). In some embodiments, these user interfaces may further enable the user to provide an attribute type for one or more segments that identifies a type of item attribute (e.g., brand) to which the segment relates.

The crowdsourcing platform (or the adaptive response engine hosting a crowdsourcing platform) can be configured to identify when the same segment(s) derived from a title (e.g., a same segment including the same number of tokens/words that are in the same sequence) have been identified over a threshold number of times and/or by over a threshold percentage (e.g., over 50%, over 75%, etc.) of all users that have been presented that particular title. If so, that title and its identified segments may be added to the training data set 404. Similarly, the crowdsourcing platform (or the adaptive response engine) can be configured to identify when the same attribute type (e.g., brand, product time, dimensions, etc.) have been assigned by crowdsource users over a threshold number of times and/or by over a threshold percentage (e.g., over 50%, over 75%, etc.) of all users that have been presented that particular title and/or those users that have assigned the segment an attribute type. If so, that attribute type may be included in the training data set 404 with the attribute annotation data 408. It should be appreciated that the segmentation data 406 and the attribute annotation data 408 for a given item (or item title) may be stored in separate containers (e.g., a mapping of attribute type to a particular segment of a particular title and a list of token indexes (e.g., word indexes) that identify a particular token as being a beginning token of a segment) or a common container (e.g., a single item or item title object). Additionally, the title segment model 201 may be trained utilizing only the segmentation data 406 to identify segments of the input data. In some embodiments, a separate machine-learning model (e.g., an attribute type model not depicted) may be trained using the attribute annotation data 408 to identify one or more types of one or more segments.

In some embodiments, the adaptive response engine may be configured to filter one or more titles from the training data set 404. For example, titles in which the ratio of tokens that are identified (e.g., previously, by a crowdsourcing platform, etc.) as the beginning of a segment may be divided by the total number of tokens within the title. In some embodiments, if the resultant value does not meet or exceed a threshold value (e.g., over 0.15 to indicate that over 15% of the tokens open a segment), the adaptive response engine 102 may be configured to filter the title (or otherwise not include the title) in the training data set 404. As another example, the adaptive response engine may be configured to filter and suitable segmentation data and/or attribute annotation data from the training data set 404 for titles that include a number of tokens that does not fall in a predetermined number range (e.g., 5-15 tokens). By utilizing these filtering techniques, the adaptive response engine may improve the quality of data included in the training data set as data that is of an optimal length and has an optimal number of segments within each title.

Any suitable portion of the training data set 404 may be utilized to train the title segment model 401. In some embodiments, the training may utilize any suitable supervised machine-learning technique. A supervised machine-learning technique is intended to refer to any suitable machine-learning algorithm that maps an input to an output based on example input-output pairs. A supervised learning algorithm (e.g., decision trees, reinforcement-based learning for artificial neural networks, distance functions such as nearest neighbor functions, regression analysis, etc.) may analyze the training data and produce an inferred function (also referred to as "a model"), which can be used identifying an output for a subsequent input. Accordingly, by executing the supervised learning algorithm on the training data set 404, the title segment model 401 may be trained to identify one or more segments (and attribute types for those segments) from subsequent input data (e.g., subsequently provided item titles).

In some embodiments, the title segment model 401 may be a feed forward artificial neural network with one hidden layer atop of a trainable embedding layer. A feed forward neural network may be an artificial neural network wherein connections between the nodes in the neural network do not form a cycle. In this type of neural network, the information moves in only one direction, forward, from node to node. In some embodiments, the title segment model 401 may identify a subset of the input data (e.g., five tokens in the order in which they appear in the title). The title segment model 401 may evaluate the tokens to identify whether a center token opens a segment or not. By way of example, a window including token 1, token 2, token 3, token 4, and token 5 may be evaluated to determine whether token 3 opens (e.g., begins) a segment or not. If the token is identified as opening a segment, the token may be associated with a segment label (e.g., with a "1") to indicate it is the first token of a segment, else the token may be otherwise labeled (e.g., with a "0") or otherwise remain unassociated with a label to indicate that it is not the first token of a segment. In some embodiments, the subset of input data may change according to a sliding window. It should be appreciated that at least some of the tokens in the window may include a special character inserted by the system. For example, a 5-token window for evaluating the first word in a title may include 2 special symbols in the first and second position of the window, followed by the first token in the title, the second token in the title, and a third token in the title, respectively. A second evaluation may occur for the second token in the title using a window including a symbol denoting a padded value, the first token in the title, followed by the second, third, and fourth tokes of the title, respectively. The window may be moved at each evaluation until all tokens in the title have been evaluated. The last evaluation may be of token 5 and the window may include token 3, token 4, token 5, following by two special symbols indicating padded values. In this manner, each token (e.g., word) of the input data may be evaluated and labeled as opening a segment or not according to at least some of the surrounding tokens (e.g., some tokens that precede the token in the title and/or some tokens that subsequently occur in the title). A segment may then be identified corresponding to each token that was identified as an opening token. Each segment may include a token indicated as opening a segment and every sequential token occurring after the opening token until another token that opens a segment is reached in the title.

Once trained, a title from the training data set 404 may be provided to the title segment model 401 and a number of segments (e.g., segments 1-N, collectively referred to as segments 410) may be identified. These segments may be utilized for an evaluation procedure 412 to evaluate the quality of the title segment model 401 with respect to accuracy of the segment(s) identified from the title and/or the accuracy of the attribute type identified for each segment. The output of the title (e.g., segments 410) and/or an attribute type (e.g., brand) indicating a particular item attribute to which the segment relates may be compared to the corresponding data associated with the title and included in the training data set 404 to identify whether the title segment model 401 identified segment(s) and/or attribute types that match those found in the training data set 404 and associated with the title being analyzed. For example, if 90 out of 100 titles had a set of segments identified by the model match those found in the training data set 404, then the title segment model 401 may be considered to be 90% accurate. In some embodiments, if the accuracy is determined to be at or below a threshold value (e.g., 50% indicating it is just as likely the segment/attribute type is incorrect as it is that the segment/attribute type is correct), the adaptive response engine may be configured to adjust the training data set 404 (e.g., obtain additional input from crowdsourcing platform users) and retrain the title segment model 401. These operations may occur any suitable number of times until the title segment model 401 is identified by the evaluation procedure 412 as accurate over a threshold percent (e.g., 90% indicating that the model identifies the same segments as found in the training data set 404 for 90% of the inputs provided).

As another example, the accuracy of the title segment model 401 may be evaluated by identifying, for each token of the title, if the segment label (e.g., an indicator such as a 0 or 1 that identifies whether the token opens a segment or not) for each token was accurately assigned based at least in part on crowdsourced input. By way of example, part of the evaluation procedure 412 may include obtaining feedback from one or more crowdsourcing platform users identifying whether a segment, a set of segments, segment labels of a tile, and/or an attribute type for a given title have been accurately identified by the model. Any suitable user interfaces provided by the adaptive response engine may be utilized to solicit feedback from the crowdsourcing platform users. In some embodiments, the feedback may indicate one or more reasons the segment(s), segment label(s), and/or attribute type was inaccurate. For example, the adaptive response engine may obtain data from the crowdsource platform corresponding to segment labels of each token of any suitable number of title. The number of correctly identified segment labels may be totaled and averaged (e.g., divided) by a number representing the number of tokens across all titles utilized. As yet another example, the segments identified by the title segment model 401 may be compared to segments identified by the crowdsource users and the number corresponding to a match may be divided by a number of total predicted segments to calculate a precision value. A recall value may be calculated by determining the number of predicted segments that exactly match the crowdsource user-identified segments and dividing by the crowdsource user-identified segments. An overall accuracy value can be then calculated by obtaining the harmonic mean between the precision value and the recall value and averaging the result across all titles. The title segment model 401 may be deemed to be accurate (and therefore deployable/usable) when the accuracy value meets and/or exceeds a predetermined threshold value.

In some embodiments, the evaluation procedure 412 may occur at any suitable time as new training data is generated. By way of example, as the title segment model 401 identifies subsequent segments and/or attribute types of a title, this new data may be included in the training data set 404 and filtered as described above to form an updated version of the training data set 404. Periodically and/or according to a schedule, the adaptive response engine may be configured to retrain the title segment model 401 utilizing the updated version of the training data set 404.

The method 400A may be performed any suitable number of times at any suitable interval and/or according to any suitable schedule such that the accuracy of title segment model 201 is improved over time.

The title segment model 401 is an example of a segmentation model. Other types of segmentation models are contemplated. For example, a segmentation model may be trained to identify segments from user input. In this scenario, the method 400A may be similarly applied. However, the segmentation data 406 in this scenario may include example user inputs (e.g., user input examples historically provided to a set of devices, user input examples provided by crowd source users, etc.). In this scenario, no annotation may be utilized. The same techniques discussed in method 400A may be utilized to train any suitable segmentation model so long as a training data set is obtained that indicates example input and corresponding predefined segments of each example.

Figure 4B:
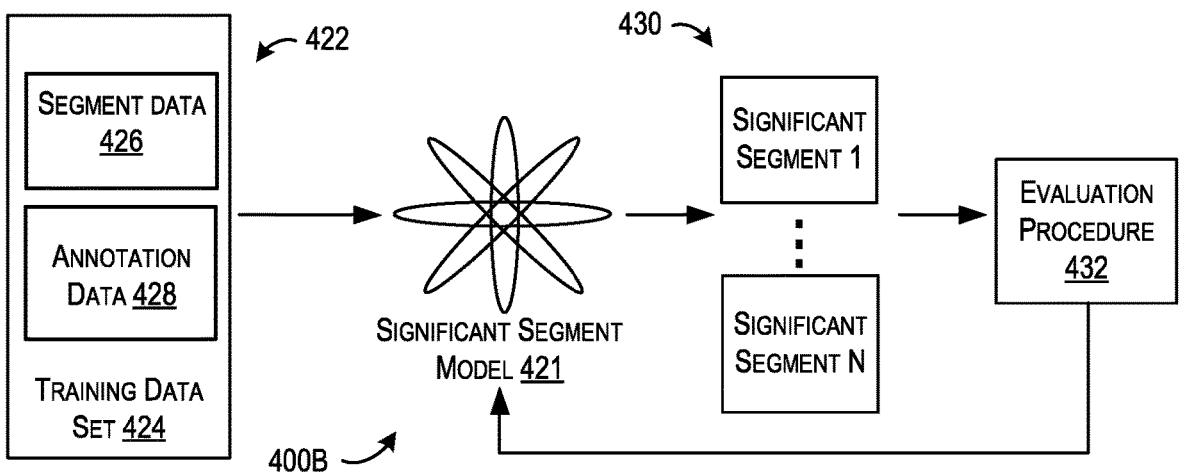

FIG. 4B includes a flowchart illustrating an example method 400B for training the significant segment model discussed above (of which significant segment model 421 is an example), in accordance with at least one embodiment. The method 400B may be performed by any of the adaptive response engines of FIGS. 1-3.

In some embodiments, the method 400B may begin at 422, where the adaptive response engine (or a component thereof) may obtain training data set 424. Training data set 424 may include any suitable data with which significant segment model 421 may be trained to identify one or more significant segments a set of segments derived from input data. By way of example, training data set 424 may include segment data 426. Segment data 426 may identify example set of segments (e.g., sets of segments identified from user input data utilizing predefined segmentation rules and/or a segmentation model that has been trained to identify segments from user input data). The annotation data 428 may include one or more indicators that indicate which segments of a set, if any, are to be considered a significant segment. In some embodiments, the significant segments may be specified in any suitable manner. In some embodiments, each significant segment identified in the training set may be manually assigned a significance score (e.g., a score, a priority level, or any suitable value indicating a relative priority between a given significant segment and other significant segments).

In some embodiments, the segment data 426 and/or the annotation data 428 may be predefined and/or any suitable combination of the segment data 426 and annotation data 428 may be obtained from a crowdsourcing platform. A crowdsourcing platform may provide one or more user interfaces with which a plurality of crowdsourcing platform users may review example sets of segments to provide an indication that a particular segment or segments is/are more significant than the other segments of the input data.

The crowdsourcing platform (or the adaptive response engine hosting a crowdsourcing platform) can be configured to identify when a segment has been deemed "significant" over a threshold number of times and/or by over a threshold percentage (e.g., over 50%, over 75%, etc.) of all users that have been presented. If so, the set of segments and the indicators of which segments are significant may be added to the training data set 424. Similarly, the crowdsourcing platform (or the adaptive response engine) can be configured to identify when the same segment(s) have been identified as "significant" over a threshold number of times and/or by over a threshold percentage (e.g., over 50%, over 75%, etc.) of all users that have been presented that particular example. If so, the example may be included in the training data set 424. In some embodiments, the crowdsourcing platform may be configured to allow crowdsource users to provide a significance score (or otherwise rank and/or score) two or more significant segments to indicate a relative degree of significance between the two or more significant segments.

Any suitable portion of the training data set 424 may be utilized to train the significant segment model 421. In some embodiments, the training may utilize any suitable supervised machine-learning technique. A supervised machine-learning technique is intended to refer to any suitable machine-learning algorithm that maps an input to an output based on example input-output pairs. A supervised learning algorithm (e.g., decision trees, reinforcement-based learning for artificial neural networks, distance functions such as nearest neighbor functions, regression analysis, etc.) may analyze the training data set 424 and produce an inferred function (also referred to as "a model"), which can be used identifying an output for a subsequent input. Accordingly, by executing the supervised learning algorithm on the training data set 424, the significant segment model 421 1 may be trained to identify one or more significant segments from subsequent input data (e.g., subsequent sets of segments such as segments identified from user input 106 of FIG. 1).

Once trained, a set of segments may be provided to the significant segment model 421 and a particular segment (or particular segments) (e.g., significant segments 1-N, collectively referred to as significant segment(s) 430) may be identified by the model as being significant. These significant segment(s) 430 may be utilized for an evaluation procedure 432 to evaluate the quality of the significant segment model 421 with respect to accuracy. The significant segment(s) 430 may be compared to the corresponding data associated with the a set of segments included in the training data set 424 to identify whether the significant segment model 421 identified the same significant segments as indicated in the training data set 424. If the accuracy of the model in identifying the same significant segments as the training data set is determined to be at or below a threshold value (e.g., 90% or below), the adaptive response engine may be configured to adjust the training data set 424 (e.g., obtain additional examples) and retrain the significant segment model 421. These operations may occur any suitable number of times until the significant segment model 421 is identified by the evaluation procedure 432 as accurate over a threshold percent (e.g., 90% indicating that the model identifies the same significant segments as found in the training data set 424 for 90% of the inputs provided).

As another example, the accuracy of the significant segment model 421 may be evaluated by identifying whether the significant segment(s) 430 match significant segments identified by crowdsourced input. By way of example, part of the evaluation procedure 432 may include obtaining feedback from one or more crowdsourcing platform users identifying whether a segment has been accurately identified as a significant segment by the model. Any suitable user interfaces provided by the adaptive response engine may be utilized to solicit feedback from the crowdsourcing platform users. The number of correctly identified significant segments may be totaled and averaged (e.g., divided) by a number representing the number of segments across all examples utilized. As yet another example, the significant segments identified by the significant segment model 421 may be compared to segments identified as significant by the crowdsource users and the number corresponding to a match may be divided by a number of total predicted segments to calculate a precision value. The significant segment model 421 may be deemed to be accurate (and therefore deployable/usable) when the accuracy value meets and/or exceeds a predetermined threshold value.

In some embodiments, the evaluation procedure 432 may occur at any suitable time as new training data is generated. By way of example, as the significant segment model 421 identifies subsequent segments as significant, this new data may be included in the training data set 424 and to form an updated version of the training data set 424. Periodically and/or according to a schedule, the adaptive response engine may be configured to retrain the significant segment model 421 utilizing the updated version of the training data set 424.

The method 400B may be performed any suitable number of times at any suitable interval and/or according to any suitable schedule such that the accuracy of significant segment model 421 is improved over time.

It should be appreciated that machine-learning models discussed herein (e.g., the title segment model 401, the significant segment model 421) may be utilized to identify segments (e.g., title segments, significant segments identified from historical user account data such as the item attributes of items that the user has interacted with in the past, significant segments from past user queries, and the like) from data known prior to runtime as part of an offline process rather than at runtime in order to increase the efficiency of the system at runtime.

Figure 4C:
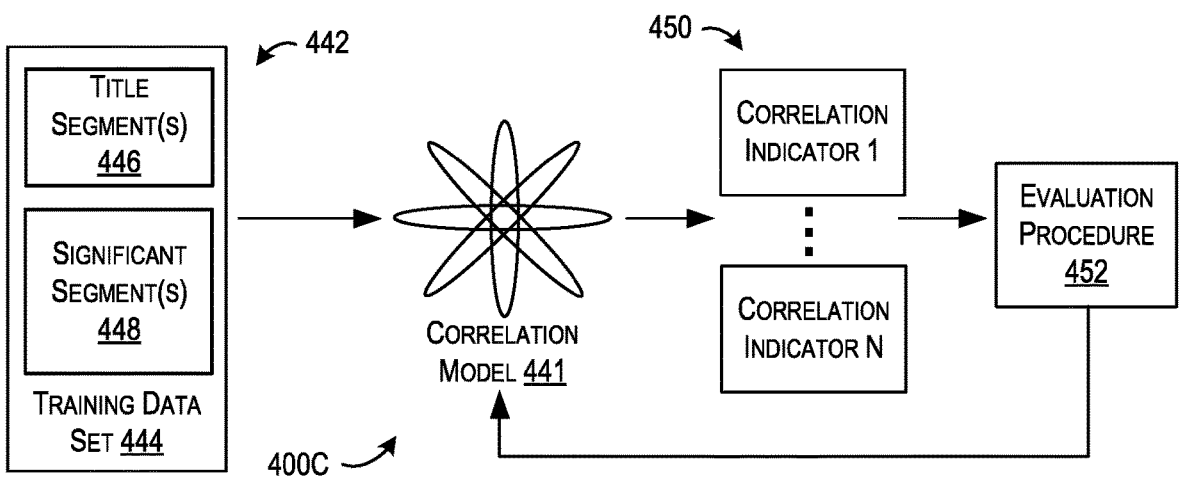

FIG. 4C includes a flowchart illustrating an example method 400C for training the correlation model discussed above (of which correlation model 441 is an example), in accordance with at least one embodiment. The method 400C may be performed by any of the adaptive response engines of FIGS. 1-3.

In some embodiments, the method 400C may begin at 442, where the adaptive response engine (or a component thereof) may obtain training data set 444. Training data set 444 may include any suitable data with which correlation model 441 may be trained to identify whether a title segment correlates to a significant segment. By way of example, training data set 444 may include title segment(s) 446 (e.g., title segments identified by the title segment model 401) and significant segment(s) 448 (e.g., the significant segments identified by the significant segment model 421). As a non-limiting example, the title segment(s) 446 may be identified from an item title (e.g., item title 122 of FIG. 1) identified in response to a user request (e.g., user input 106 of FIG. 1) and the significant segment(s) 448 may be significant segments identified from the text of the user request (e.g., significant segment 130 of FIG. 1). In some embodiments, each title segment of the title segment(s) 446 may include indicator that indicates whether or not the title segment corresponds to at least one of a corresponding set of significant segments.

In some embodiments, the title segment(s) 446 and/or the significant segment(s) 448 may be predefined and/or any suitable combination of the title segment(s) 446 and/or the significant segment(s) 448 may be obtained from a crowdsourcing platform. A crowdsourcing platform may provide one or more user interfaces with which a plurality of crowdsourcing platform users may review example sets of title segments and corresponding sets of significant segments identified from the title segments to provide an indication that a particular title segment correlates to one of the provided significant segments.

The crowdsourcing platform (or the adaptive response engine hosting a crowdsourcing platform) can be configured to identify when a title segment has been deemed to correlate to a significant segment over a threshold number of times and/or by over a threshold percentage of all users that have been presented. If so, the set of title segments and the indicators of which segments are significant, as well as the corresponding set of significant segments, may be added to the training data set 444. Similarly, the crowdsourcing platform (or the adaptive response engine) can be configured to identify when the same title segment(s) have been deemed to correlate to a significant segment over a threshold number of times and/or by over a threshold percentage (e.g., over 50%, over 75%, etc.) of all users that have been presented that particular example. If so, the example may be included in the training data set 444.

Any suitable portion of the training data set 444 may be utilized to train the correlation model 441. In some embodiments, the training may utilize any suitable supervised machine-learning technique. A supervised machine-learning technique is intended to refer to any suitable machine-learning algorithm that maps an input to an output based on example input-output sets. A supervised learning algorithm (e.g., decision trees, reinforcement-based learning for artificial neural networks, distance functions such as nearest neighbor functions, regression analysis, etc.) may analyze the training data set 444 and produce an inferred function (also referred to as "a model"), which can be used identifying an output for a subsequent input. Accordingly, by executing the supervised learning algorithm on the training data set 444, the correlation model 441 may be trained to identify one or more title segments that correlate to at least one of a corresponding set of significant segments.

Once trained, a set of title segments and a set of significant segments may be provided to the correlation model 441 and the model may output a set of correlation indicators (e.g., correlation indicators 450). The set of correlation indicators 450 may include any suitable number of indicators that individually correspond to a particular title segment and indicate whether that title segment corresponds to a significant segment or not. These correlation indicators 450 may be utilized for an evaluation procedure 452 to evaluate the quality of the correlation model 441 with respect to accuracy. The correlation indicators 450 may be compared to the corresponding indicators of the training data set 444 to identify whether the correlation model 441 identified the same title segments being correlated to a significant segment. If the accuracy of the model is determined to be at or below a threshold value (e.g., 90% or below), the adaptive response engine may be configured to adjust the training data set 444 (e.g., obtain additional examples) and retrain the correlation model 441. These operations may occur any suitable number of times until the correlation model 441 is identified by the evaluation procedure 452 as accurate over a threshold percent (e.g., 90% indicating that the model identifies the same correlations as found in the training data set 444 for 90% of the inputs provided).

As another example, the accuracy of the correlation model 441 may be evaluated by identifying whether the correlations indicators 450 match correlations identified by crowd-sourced input. By way of example, part of the evaluation procedure 452 may include obtaining feedback from one or more crowdsourcing platform users identifying whether the correlation model 441 has been accurately identified as a correlation between a title segment and a set of significant segments. Any suitable user interfaces provided by the adaptive response engine may be utilized to solicit feedback from the crowdsourcing platform users. The number of correctly identified correlations may be totaled and averaged (e.g., divided) by a number representing the number of examples utilized. As yet another example, the correlations identified by the correlation model 441 may be compared to correlations identified by the crowdsource users and the number corresponding of matches may be divided by a number of total of examples. The correlation model 441 may be deemed to be accurate (and therefore deployable/usable) when the accuracy value meets and/or exceeds a predetermined threshold value.

In some embodiments, the evaluation procedure 452 may occur at any suitable time as new training data is generated. By way of example, as the correlation model 441 identifies subsequent correlations between title segments and one or more significant segments, this new data may be included in the training data set 444 and to form an updated version of the training data set 444. Periodically and/or according to a schedule, the adaptive response engine may be configured to retrain the correlation model 441 utilizing the updated version of the training data set 444.

The method 400C may be performed any suitable number of times at any suitable interval and/or according to any suitable schedule such that the accuracy of correlation model 441 is improved over time.

Figure 5:
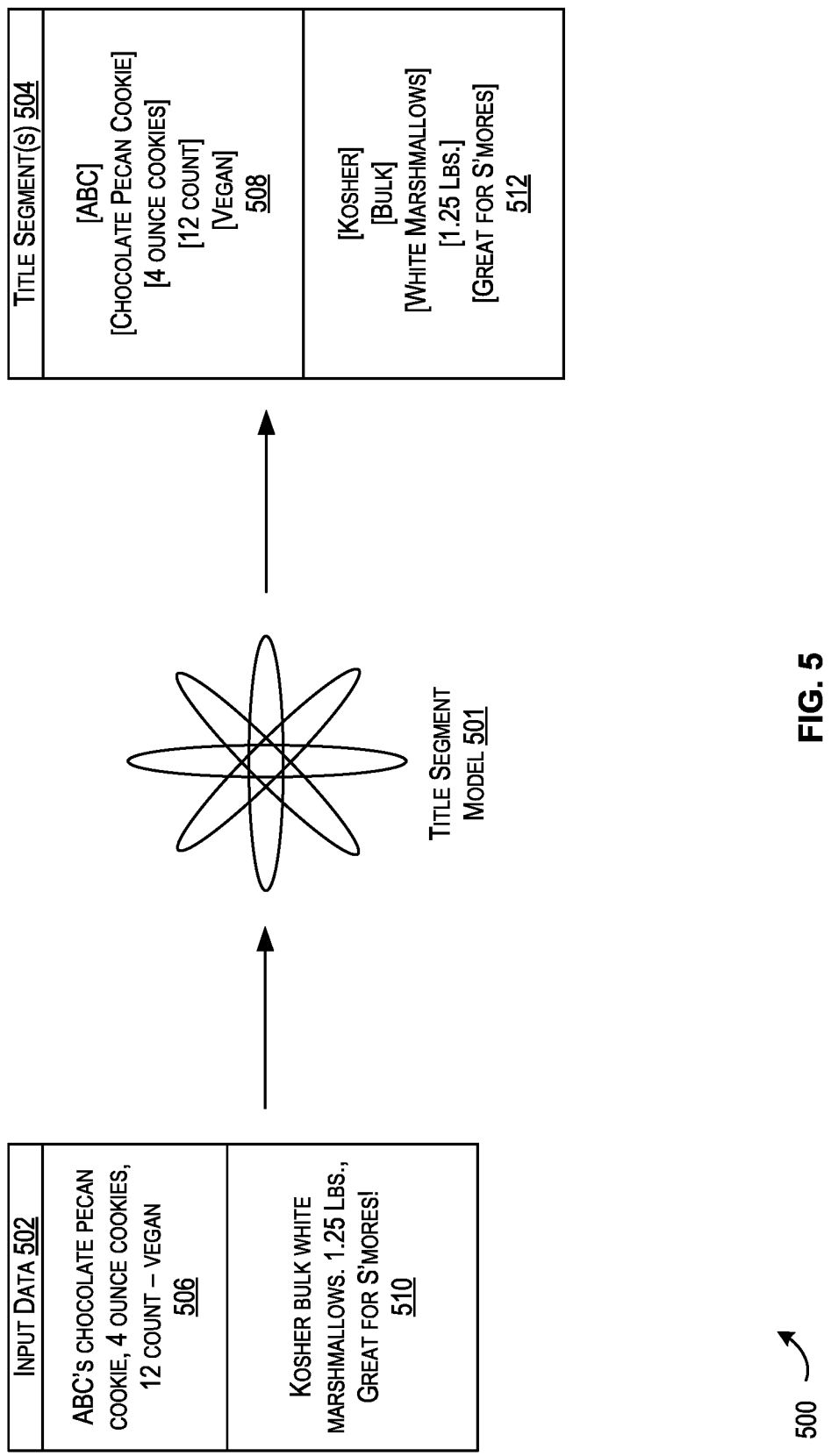
FIG. 5 includes a flowchart illustrating an example method for identifying a title segment, in accordance with at least one embodiment.

FIG. 5 includes a flowchart illustrating an example method 500 for identifying a title segment, in accordance with at least one embodiment. The title segment identification method 500 may be performed by an adaptive response engine (e.g., the adaptive response engine 102, 202, and/or 302 of FIG. 3, respectively). In some embodiments, the method 400A of FIG. 4A may be previously performed to train the title segment model 501 (e.g., an example of the title segment model 401 of FIG. 4A) to identify title segments from input data (e.g., item titles).

By way of example, input data 304 may include a number of example item titles. At any suitable time, one or more item titles may be provided to the title segment model 501 as input data (e.g., input data 502). The title segment model 501 may output a corresponding set of title segments (e.g., title segment(s) 504). For example, input data 506 may be provided to the title segment model 501, which may in turn output title segment set 508. Similarly, input data 510 may be provided to the title segment model 501, which may in turn output title segment set 512.

Figure 6:
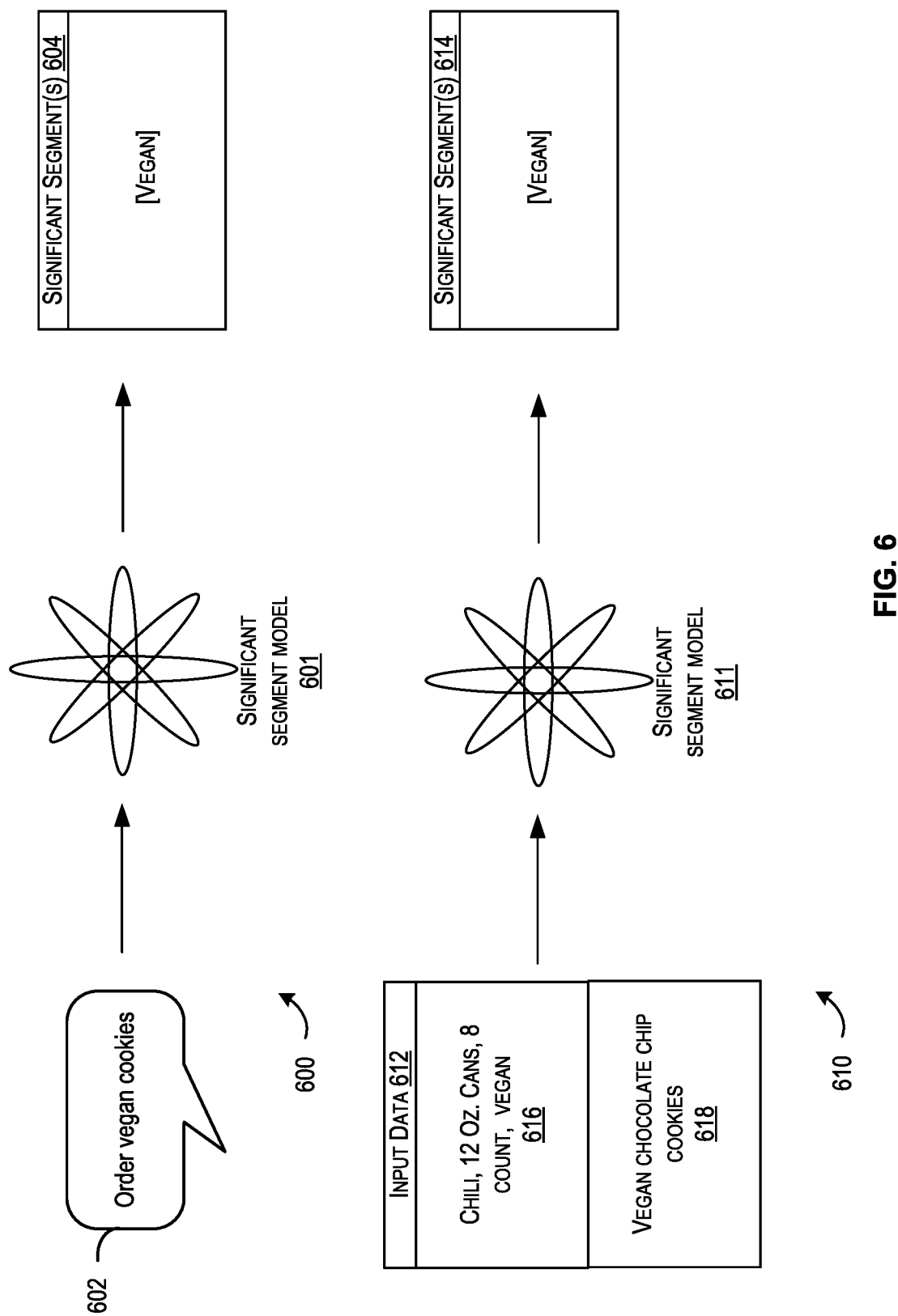
FIG. 6 includes a flowchart illustrating an example method for identifying a significant segment, in accordance with at least one embodiment.

FIG. 6 includes a flowchart illustrating an example method 600 for identifying a significant segment, in accordance with at least one embodiment. Method 600 may be performed by an adaptive response engine (e.g., the adaptive response engine 102, 202, and/or 302 of FIGS. 1-3, respectively). In some embodiments, the method 400B of FIG. 4B may be previously performed to train the significant segment model 601 (e.g., an example of the significant segment model 421 of FIG. 4B) to identify significant segments from input data (e.g., a set of segments identified from user input).

By way of example, input data 602 (e.g., an example of user input 106, 206, and 306, of FIGS. 1-3, respectively) may be provided to the significant segment model 601. The significant segment model 601 may output a corresponding set of significant segments (e.g., significant segment(s) 604) identified from the input data 602.

Method 610 may alternatively be utilized. As part of method 610 (or prior to method 610), an alternative model (e.g., the significant segment model 611) may be trained utilizing an unsupervised machine-learning technique to identify correlations between variables of item information training data. For example, the input data 612 (e.g., item information corresponding to one or more items identified utilizing user account data associated with a user) may be provided as input to the significant segment model 611. An unsupervised machine-learning algorithm (e.g., a clustering algorithm, a classification algorithm, etc.) may be executed on the data to identify correlations between particular portions of the item information and interactions (e.g., viewing, purchasing, adding the item to a shopping cart) with the item by the user. Said another way, the unsupervised machine-learning algorithm may be utilized to identify that the user often interacts with items that have particular features (as determined from the item information). The significant segment(s) 614 is intended to depict a set of significant segments identified by the significant segment model 611 based at least in part on the input data 612. For example, the input data 612 may include item information 616 (e.g., item information corresponding an item that was previously viewed by the user) and item information 618 (e.g., item information corresponding to an item that was previously purchased by the user). The significant segment model 611, utilizing unsupervised learning techniques and at least the item information 616 and 618, may identify a correlation between the user and the segment "Vegan."

It should be appreciated that the significant segment model 601 may be configured to provide a significance score as output along with the one or more significant segments. In some embodiments, each segment of the input data (e.g., input data 602, input data 612, etc.) may be scored based at least in part on an assessment of the significance of the segment (e.g., overall and/or with respect to other segments of the input). The significance score may be computed according to a set of predetermined rules. In some embodiments, the significance score may correlate to a confidence score that the significant segment model 601 may provide that indicates a percentage of confidence the model has in classifying/identifying the segment as being one that is significant. In some embodiments, the significance score of a given segment may quantify an amount by which the given segment conforms to previously known significant segments and/or the significance score can quantify a number of previously known significant segments with which the given segment is within some similarity threshold.

Figure 7:
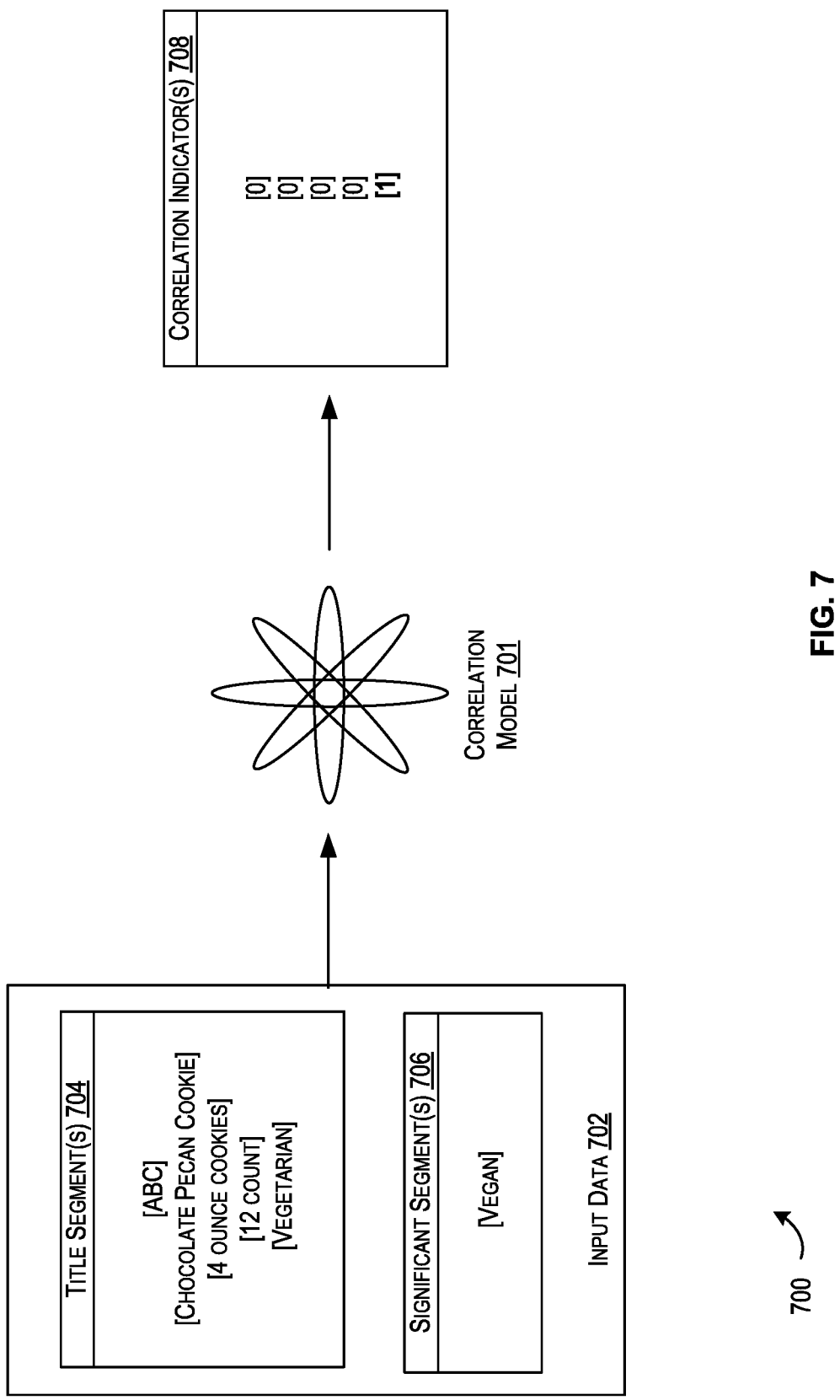
FIG. 7 includes a flowchart illustrating an example method for correlating a significant segment to a title segment, in accordance with at least one embodiment.

FIG. 7 includes a flowchart illustrating an example method 700 for correlating a significant segment to a title segment. Method 700 may be performed by an adaptive response engine (e.g., the adaptive response engine 102, 202, and/or 302 of FIGS. 1-3, respectively). In some embodiments, the method 400C of FIG. 4C may be previously performed to train the correlation model 701 (e.g., an example of the correlation model 441 of FIG. 4C) to identify significant segments from input data (e.g., a set of segments identified from user input).

By way of example, input data 702 may be provided to the correlation model 701. The input data 702 may include a set of title segments (e.g., title segment(s) 704, an example of the title segments 126 of FIG. 1) and a set of significant segment(s) 706 (e.g., the significant segment 130 of FIG. 1 as determined from user input 106). The correlation model 701 may output a corresponding set of correlation indicator(s) (e.g., correlation indicator(s) 708. Each of the correlation indicator(s) 708 may correspond to a particular title segment of the title segment(s) 704. As depicted, a "0" indicates the title segment does not correlate to any of the significant segment(s) 706, while a "1" indicates that the particular title segment was determined to correlate to at least one of the significant segment(s) 706. As depicted in FIG. 7, the title segment "vegetarian" was determined to correlate (e.g., relate) to the significant segment(s) 706 (including the segment "vegan"). Method 700 may be performed as part of the operations performed at step 132 of FIG. 1, 236 of FIG. 2, and/or 328 of FIG. 3.

Figure 8:
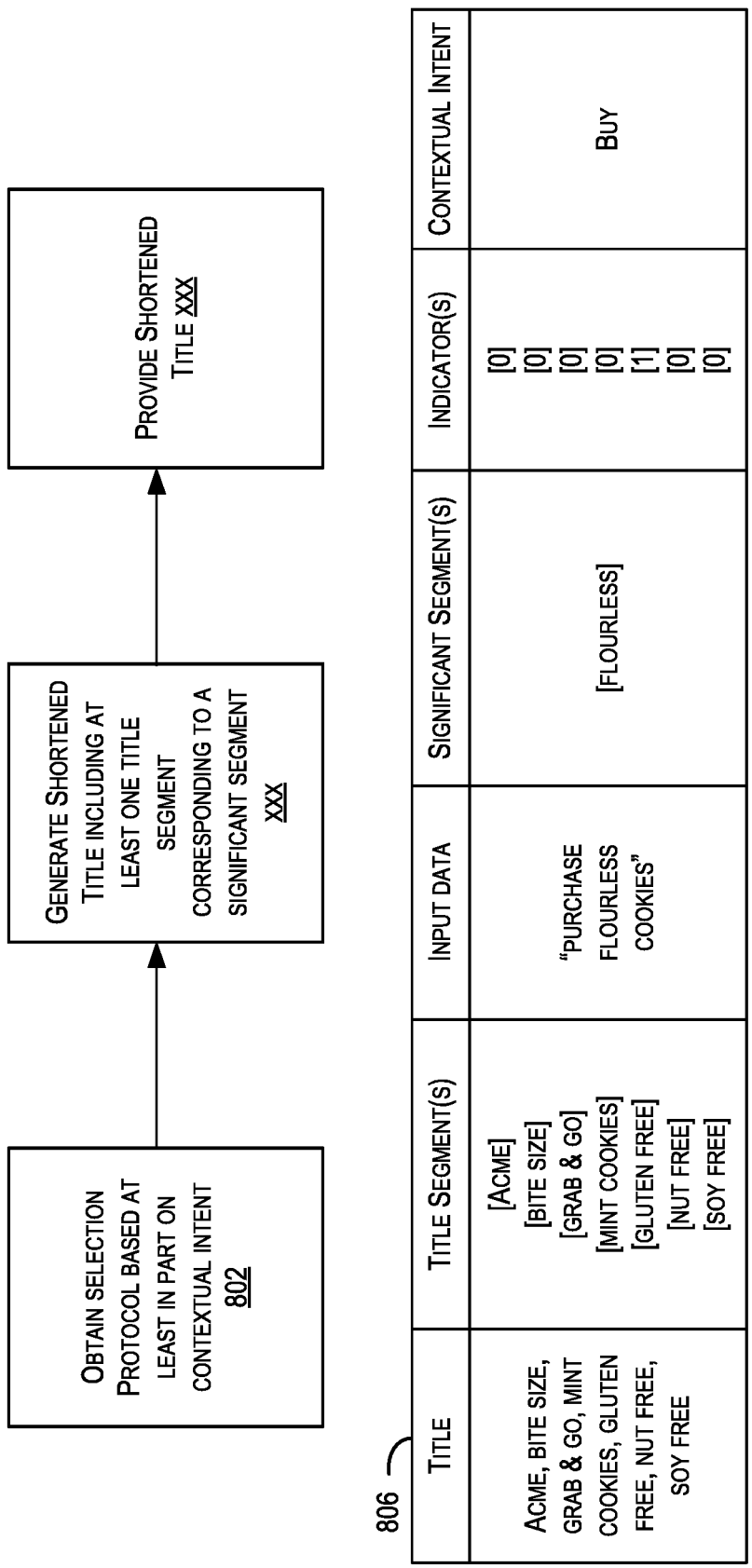
FIG. 8 includes a flowchart illustrating an example method for providing a shortened title, in accordance with at least one embodiment.

FIG. 8 includes a flowchart illustrating an example method 800 for providing a shortened title, in accordance with at least one embodiment. Method 800 may begin at 802 where a selection protocol (e.g., a predefined set of selection rules, a selection model) is obtained (e.g., by the adaptive response engine 102 of FIGS. 1 and 2).

In some embodiments, the adaptive response engine (e.g., the adaptive response engine 102, 202, and/or 302 of FIGS. 1-3) may identify a particular selection protocol from a set of one or more selection protocols. In the examples provided in FIGS. 1-3, the adaptive response engine may consult a predefined mapping of shortened title types (e.g., long, medium, short) to corresponding to the contextual intent (e.g., buy intent, reorder intent, cancel intent, etc.) identified from the user input of those examples, in order to identify a type of shortened title to be utilized when providing a response to the user input. By way of example, the mapping may indicate that a response to a response to user input identified as having the contextual intent to buy an item (e.g., buy intent) is to utilize a long title, while a response to user input that is identified as having a different contextual intent (e.g., reorder intent, cancel intent, etc.) is to utilize a shortened title of a different type (e.g., a medium title, a short title, etc.). Each selection protocol type may be associated with a predefined set of selection rules. By way of example, a selection protocol for a long title may include any suitable number of rules for selecting title segments to be included in a long title (which may still be shorter than an original title for the item). It should be appreciated that a type associated with a shortened title may refer to a title length (e.g., as measured in words, terms, tokens, segments, etc.) and/or the type may refer to a selection protocol to be utilized to generate the shortened title (e.g., a set of predetermined selection rules associated with generating a long title, a different set of predetermined selection rules associated with generating a short title, etc.). The adaptive response engine may generate a shortened title of the prescribed type according to the selection protocol (or portion of the selection protocol) associated with that type.

In some embodiments, another machine-learning model (e.g., a selection model) may be trained to select segments for a shortened title utilizing training examples individually including a title and/or the title segments identified for the title, significant segments of input data, the input data (e.g., user input, historical user data, etc.), indicators indicating which title segment(s) correlate to a significant segment, and an ideal title (e.g., a combination of one or more of the title segments) that has been manually identified. Any suitable supervised learning algorithm may be executed on the training data to train the selection model to identify shortened titles for subsequent inputs. In some embodiments, a single selection model may be utilized regardless of the contextual intent, while in other example, different selection models may be trained specifically for generating a particular type of shortened title corresponding to the contextual intent. Said another way, a selection model may be trained to select title segments and generate long shortened titles from the segments selected, while a different selection model may be trained to select title segments and generate medium shortened titles from the segments selected, and still another selection model may be utilized to select title segments and generate short shortened titles from the segments selected. A selection model may be obtained based at least in part on determining the model is associated with a particular contextual intent (e.g., the contextual intent identified from user input 106 of FIG. 1).

In some embodiments, the selection protocol and/or the selection model used to select title segments and generate the shortened title may cause title segments corresponding to significant segments of the user request to be preferred over other segments (e.g., title segments corresponding to an item attribute type, title segments that do not correspond to an item attribute type, etc.). It may be the case that the selection protocol and/or model may cause title segments corresponding to an item attribute type to be preferred over title segments that do not correspond to an item attribute type, title segments corresponding to one or more specific item attribute type(s) to be preferred over title segments corresponding to other item attribute types or title segments that do not correspond to an item attribute type.

As a non-limiting example, a selection protocol (e.g., a "short" selection protocol) may be predetermined with the goal of providing a relatively short title that still conveys pertinent of information (e.g., a product type of the item and any title segments of the item corresponding to a significant segment of the user's request). The selection protocol may specify that the title is not to exceed a threshold number of tokens (e.g., 5 tokens, 6 tokens, etc.). In some embodiments, if a segment associated with a particular item attribute (e.g., product type) is not found within the title, the selection protocol may specify that no shortened title can be generated. Other the other hand, if a segment associated with that particular item attribute type (e.g., product type) is found, the selection protocol may specify that that segment is to be utilized as a shortened title so long as the segment does not exceed a maximum number of tokens (e.g., 5 tokens, 3 tokens) as defined in the selection protocol. It should be appreciated that, in some embodiments, if a shortened title is not generated as a result of the rules of one selection protocol, additional rules of the selection protocol may identify different selection rules that may be utilized as a default to produce a shortened title. As a non-limiting example, if the title does not contain a segment associated with a product type attribute, the selection protocol may identify other rules (e.g., associated with the "medium" selection protocol discussed below) to be executed to generate a shortened title for the item. In some embodiments, the short selection protocol may specify that any and/or all title segments corresponding to a significant segment are to be included in the shortened title so long as the title does not exceed the predetermined length. In some embodiments, the selection protocol may specify a manner in which the title segment(s) corresponding to a significant segment may be inserted in the title regardless of the resulting length. In still further examples, title segments corresponding to significant segments may be prioritized over a segment associated with product type and, or at least, over any other item attribute type.

As another non-limiting example, a selection protocol (e.g., a "medium" selection protocol) may be predetermined with the goal of providing a shortened version of the title while enforcing a degree of preference with respect to the attribute types to which segments of the title may relate. In some embodiments, the selection protocol may further specify rules that cause segments occurring nearer the beginning of a title to be preferred over segments occurring later in the title. As a non-limiting example, the selection protocol may specify that the segments of the title be split into any suitable number of types (e.g., 3). One category (Category 1) may be utilized to indicate that corresponding segment(s) were determined to be associated with a preferred set of attribute types (e.g., a set including product type, a set including product type, brand, and product condition, etc.). Another category (Category 2) may be utilized to indicate that corresponding segments were determined to be associated with attribute types that differ from the preferred set of attribute types. Another category (Category 3) may be utilized to indicate corresponding segments without a detected attribute type (e.g., segments that were not determined to be associated with any predefined attribute type). Another category (Category 4) may be utilized to identify title segments that correspond to a significant segment (e.g., a significant segment of user input and/or historical user account data depending on the context). In some embodiments, the short selection protocol may specify that any and/or all title segments corresponding to a significant segment are to be included in the shortened title so long as the title does not exceed the predetermined length.

As a non-limiting example, one selection protocol may specify that the segments of the title are to be categorized as being a part of Category 1, Category 2, Category 3, or Category 4 discussed above. In some embodiments, the selection protocol may specify that segments of Category 4 are to be preferred over any suitable combination of segments of Types 1-3. In some embodiments, the selection protocol may specific that segments of Category 2 are to be discarded. Of the remaining tokens, the selection protocol may specific that segments are to be selected one at a time, from left to right, until the selected segment(s) collectively include or exceed a minimum threshold number of tokens (e.g., the shortened title includes at least four tokens). The selection protocol may specify that if the selected segments (after exceeding four tokens) exceed a maximum threshold number of tokens (e.g., eight tokens), no shortened title can be generated. However, if the selected segments collectively include a number of tokens that meets or exceeds the minimum threshold and does not exceed the maximum threshold, the selection protocol may specify that the selected segments are to be returned. In some embodiments, the selected segments may be concatenated and provided as a shortened title (e.g., a string of segments).

As another example, given the same types discussed above in the preceding example, the selection protocol may specify that the segments of the title are to be categorized as being a part of Category 1, Category 2, Category 3, of Category 4 discussed above and that segments associated with Category 2 are to be discarded. Of the remaining segments, the selection protocol may specific that segments are to be selected one at a time, from left to right, until one or more segments associated with one or more particular attribute types (e.g., product type and brand) have been selected. the selection protocol may further specify that if the set of selected segments include Category 1 and/or Category 4 segments and the selected segments collectively contain a number of tokens that does not exceed a maximum threshold (e.g., eight token), the selected segments may be returned (and/or a shortened title may be generated from concatenating the selected segments and the shortened title returned). The selection protocol may specify that if the set of selected segments do not include Category 1 and/or Category 4 segments, and/or the selected segments collectively contain a number of tokens that exceeds the maximum threshold (e.g., eight token), none of the selected segments are to be returned (and/or no shortened title may be generated).

It should be appreciated that the selection protocol may identify another default selection protocol (e.g., a "long"

selection protocol) to be utilized to attempt segment selection (and/or shortened title generation) in the situation that a determination is made that the selected segments are not to be returned and/or a shortened title is not to be generated.

As another non-limiting example, a selection protocol (e.g., a "long" selection protocol) may specify rules for discarding segments according to a preference associated with various attribute types. The selection protocol may specify that the segments of the title be split into any suitable number of types (e.g., 3). One category (Category 1) may be utilized to indicate that corresponding segment(s) were determined to be associated with a preferred set of attribute types. Another category (Category 2) may be utilized to indicate that corresponding segments were determined to be associated with attribute types that differ from the preferred set of attribute types. Another category (Category 3) may be utilized to indicate corresponding segments without a detected attribute type (e.g., segments that were not determined to be associated with any predefined attribute type). Another category (Category 4) may be utilized to identify title segments that correspond to a significant segment (e.g., a significant segment of user input and/or historical user account data depending on the context). The selection protocol may define rules that cause segments occurring nearer the beginning of the title to be preferred to those occurring later in the title. In some embodiments, the selection protocol may further include a predefined threshold number of tokens (e.g., 12 token) that may be included in a shortened title. Thus, the selection protocol may provide rules that return selected segments (or a shortened title generated by concatenating the selected segments) only when the threshold has not been exceeded.

In one example, the preferred set of attribute types of Category 1 may include brand, pack-size, weight, volume, and product-condition, although the particular preferred attribute types may vary. The selection protocol may specify that all segments of Category 1 and Category 4 segments may be selected from left to right. If the selected segments collectively include a number of tokens that exceed the threshold (e.g., 12 tokens) the selection protocol may specify that the selected segments are not to be returned (and/or a shortened title is not to be generated). If the currently selected segments do not exceed the threshold value, the selection protocol may specify that additional segments are to be selected (other than those already selected) by traversing the title from left to right until the selected segments collectively include a number of tokens that exceeds the threshold (e.g., the selected segments include 12 or more tokens) and at least one Category 4 segment (if a Category 4 segment exists). The selection protocol may specify that the last selected segment that caused the threshold to be exceeded is to be deselected. In some embodiments, if the selected segments now contain less than a second threshold (e.g., 6) number of tokens from segments associated with Category 3, the selection protocol may specify that a shortened title is not to be generated and/or the selected segments are not to be returned. Otherwise, the selection protocol may order the selected segments according to an order of the original title to generate and return the selected segments (or a shortened title generated by concatenating the selected segments).

It should be appreciated that the selection protocols discussed above are intended to be illustrative in nature and that selection protocols may vary in content. Additionally, any suitable selection protocol may include a default selection protocol that is to be utilized to attempt segment selection (or shortened title generation) should return of a set of selected segments (or shortened title generation) fail according to the current selection protocol.

At 804, a shortened title may be generated to include at least one title segment corresponding to a significant segment. The shortened title may be generated from any suitable combination of the input data 806 which may include a title, a set of title segments, input data (e.g., user input, historical user data, etc.), significant segment(s) identified from the input data, one or more indicators indicating whether each title segment corresponds to at least one significant segment, and a contextual intent. By way of example, a selection protocol (e.g., a predefined set of selection rules and/or a selection model may be selected based on the contextual intent (e.g., buy intent). The shortened title may be generated in accordance with the selected rules/model and may include at least one title segment (e.g., "gluten free") which was identified as correlating to a significant segment (e.g., "flourless").

At 806, the shortened title may be provided in a customized response (e.g., response 136 of FIG. 1) provided in response to a user request (e.g., user input 106 of FIG. 1).

Figure 9:
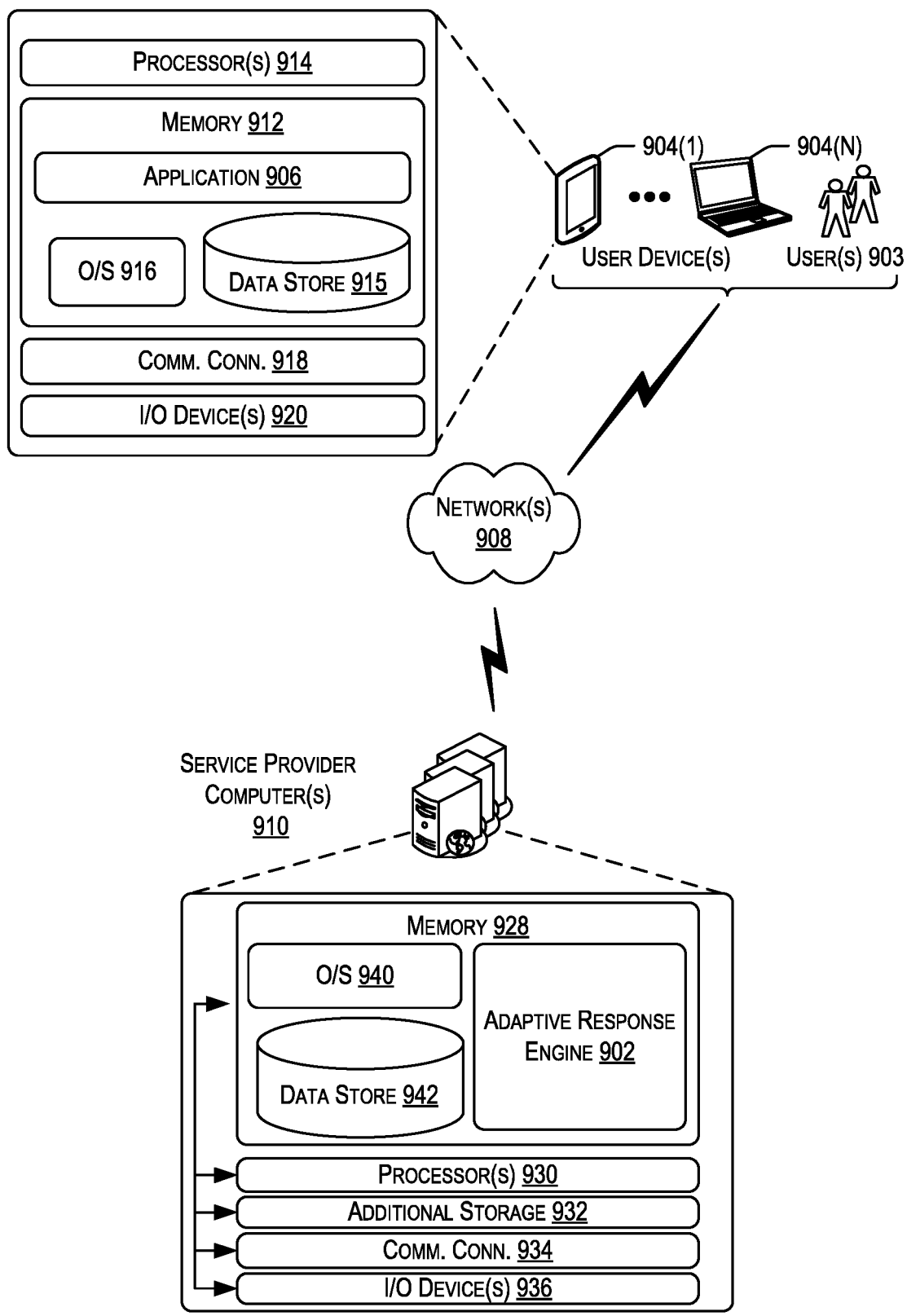
FIG. 9 illustrates example components of an adaptive response system, in accordance with at least one embodiment.

FIG. 9 illustrates components of an adaptive response system 900 according to a particular embodiment. In adaptive response system 900, one or more user(s) 903 may utilize a user device (e.g., a user device of a collection of user device(s) 904, each an example of the user devices 108, 208, and 308 of FIGS. 1-3, respectively) to provide input to the service provider computer(s) 910 (e.g., the service provider computer(s) 114 of FIG. 1). For example, the user may access any suitable input/output devices (e.g., I/O devices 920 discussed below) such as a keyboard, a microphone, and the like, to provide input (e.g., via an application 906 running on the user device(s) 904) to service provider computer(s) 910 via one or more network(s) 908. In some embodiments, the input may be audible (e.g., vocally provided by the user and received via a speaker of the user device). In some embodiments, the user device(s) 904 may be configured with any suitable speech synthesis algorithm (e.g., a text-to-speech algorithm) and/or speech recognition algorithms to convert textual data to audible output and/or to convert audible input to text. In some aspects, the application 906 operating on the user device(s) 904 may be hosted, managed, and/or provided by a computing service or service provider, such as by utilizing one or more service provider computer(s) 910.

In some examples, the network(s) 908 may include any one or a combination of many different types of networks, such as cable networks, the Internet, wireless networks, cellular networks, and other private and/or public networks. While the illustrated example represents the user(s) 903 accessing application functionality over the network(s) 908, the described techniques may equally apply in instances where the user(s) 903 interact with the service provider computer(s) 910 via the one or more user device(s) 904 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the adaptive response engine 902 (e.g., an example of the adaptive response engines of FIGS. 1-3), discussed further below in more detail, may operate in whole or in part on the user device(s) 904. Thus, in some embodiments, the user(s) 903 may access the functionality of the adaptive response engine 902 directly through the user device(s) 904 and/or the service provider computer(s) 910 via user interfaces provided by the adaptive response engine 902. In some embodiments, the functionality of the adaptive response engine 902 may be provided as a software service with which input (e.g., text such as an item title) may be submitted and output may be received (e.g., one or more shortened versions of the item title). For example, the adaptive response engine 902 may operate as part of an intelligent personal assistant service provided by the service provider computer(s) 910 which can be accessed by vocal commands provided at the user device(s) 904.

In some embodiments, the application 906 may allow the user(s) 903 to interact with the service provider computer(s) 910 so as to provide the various functionality described above with respect to the adaptive response engine 902. For example, the application 906 may be utilized to convert and/or provide user input to the service provider computer(s) 910. In some embodiments, the application 906 may convert user input comprising sound data (e.g., audio input provided via a microphone of the user device(s) 904) to textual data utilizing any suitable language recognition techniques (e.g., speech-to-text algorithms that take audio content and transcribe it to written works/textual data). The application 906 may be configured to transmit (electronically convey) the user's input(s) to the adaptive response engine 902, operating at the user device(s) 902 and/or the service provider computer(s) 910. The application 906 may further be configured to receive, process, and/or present (via a speaker of the user device(s) 904 or another suitable output device) any suitable data received from the service provider computer(s) 910 (e.g., data containing a shortened title of an item determined to be related to the user input). In some embodiments, the application 906 may receive this data from the service provider computer(s) 910 in textual format. If so, the application 906 may convert the data from text to audio output (e.g., speech) utilizing any suitable speech synthesis algorithm (e.g., a text-to-speech algorithm that enables text to be rendered as linguistic representations using, for example, a data base of prerecorded speech files).

The service provider computer(s) 910, perhaps arranged in a cluster of servers or as a server farm, may host the application 906 operating on the user device(s) 904 and/or cloud-based software services. Other server architectures may also be used to host the application 906 and/or cloud-based software services. The application 906 operating on the user device(s) 904 may be capable of handling requests from the user(s) 903 and serving, in response, various user interfaces and/or output (e.g., textual output, audio output) that can be presented at the user device(s) 904 (e.g., via a display and/or speaker). The application 906 operating on the user device(s) 904 can present any suitable type of website that supports user interaction, including search engine sites, item detail pages, and the like. The described techniques can similarly be implemented outside of the application 906, such as with other applications running on the user device(s) 904.

The user device(s) 904 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 904 may be in communication with the service provider computer(s) 910 via the network(s) 908, or via other network connections.

In one illustrative configuration, the user device(s) 904 may include at least one memory 912 and one or more processing units (or processor(s)) 914. The processor(s) 914 may be implemented as appropriate in hardware, computer-executable instructions, firmware, or combinations thereof. Computer-executable instruction or firmware implementations of the processor(s) 914 may include computer-executable or machine-executable instructions written in any suitable programming language to perform the various functions described.

The memory 912 may store program instructions that are loadable and executable on the processor(s) 914, as well as data generated during the execution of these programs. Depending on the configuration and type of user computing device, the memory 912 may be volatile (such as random access memory (RAM)) and/or non-volatile (such as read-only memory (ROM), flash memory, etc.). The user device(s) 904 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 912 may include multiple different types of memory, such as static random access memory (SRAM), dynamic random access memory (DRAM), or ROM.

Turning to the contents of the memory 912 in more detail, the memory 912 may include an operating system 916, one or more data stores 915, and one or more application programs, modules, or services for implementing the features of the adaptive response engine 902 disclosed herein, provided via the application 906 (e.g., a browser application, a shopping application, a digital assistant application, etc.). The application 906 may be configured to receive, store, and/or display a network page or other interface for interacting with the service provider computer(s) 910. In some embodiments, the application 906 may be configured to present user options and/or receive user input audibly. In some embodiments, the memory 912 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 904 may also contain communications connection(s) 918 that allow the user device(s) 904 to communicate with a stored database, another computing device or server (e.g., the service provider computer(s) 910), user terminals and/or other devices on the network(s) 908. The user device(s) 904 may also include I/O device(s) 920, such as a keyboard, a mouse, a pen, a voice input device (e.g., a microphone), a touch input device, a display, speakers, a printer, etc.

In some aspects, the service provider computer(s) 910 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 910 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 910 may be in communication with the user device(s) 904 and/or other service providers via the network(s) 908 or via other network connections. The service provider computer(s) 910 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 910 may include at least one memory 928 and one or more processing units (or processor(s)) 930. The processor(s) 930 may be implemented as appropriate in hardware, computer-executable instructions, firmware, or combinations thereof. Computer-executable instruction or firmware implementations of the processor(s) 930 may include computer-executable or machine-executable instructions written in any suitable programming language to perform the various functions described.

The memory 928 may store program instructions that are loadable and executable on the processor(s) 930, as well as data generated during the execution of these programs. Depending on the configuration and type of service provider computer(s) 910, the memory 928 may be volatile (such as RAM) and/or non-volatile (such as ROM, flash memory, etc.). The service provider computer(s) 910 or servers may also include additional storage 932, which may include removable storage and/or non-removable storage. The additional storage 932 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 928 may include multiple different types of memory, such as SRAM, DRAM, or ROM.

The memory 928, the additional storage 932, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 928 and the additional storage 932 are all examples of computer storage media. Additional types of computer storage media that may be present in the service provider computer(s) 910 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 910. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 910 may also contain communications connection(s) 934 that allow the service provider computer(s) 910 to communicate with a stored database, another computing device or server, user terminals and/or other devices on the network(s) 908. The service provider computer(s) 910 may also include I/O device(s) 936, such as a keyboard, a mouse, a pen, a voice input device, a touch input device, a display, speakers, a printer, etc.

Turning to the contents of the memory 928 in more detail, the memory 928 may include an operating system 940, one or more data stores 942, and/or one or more application programs, modules, or services for implementing the features disclosed herein, such as the features provided by the adaptive response engine 902.

Figure 10:
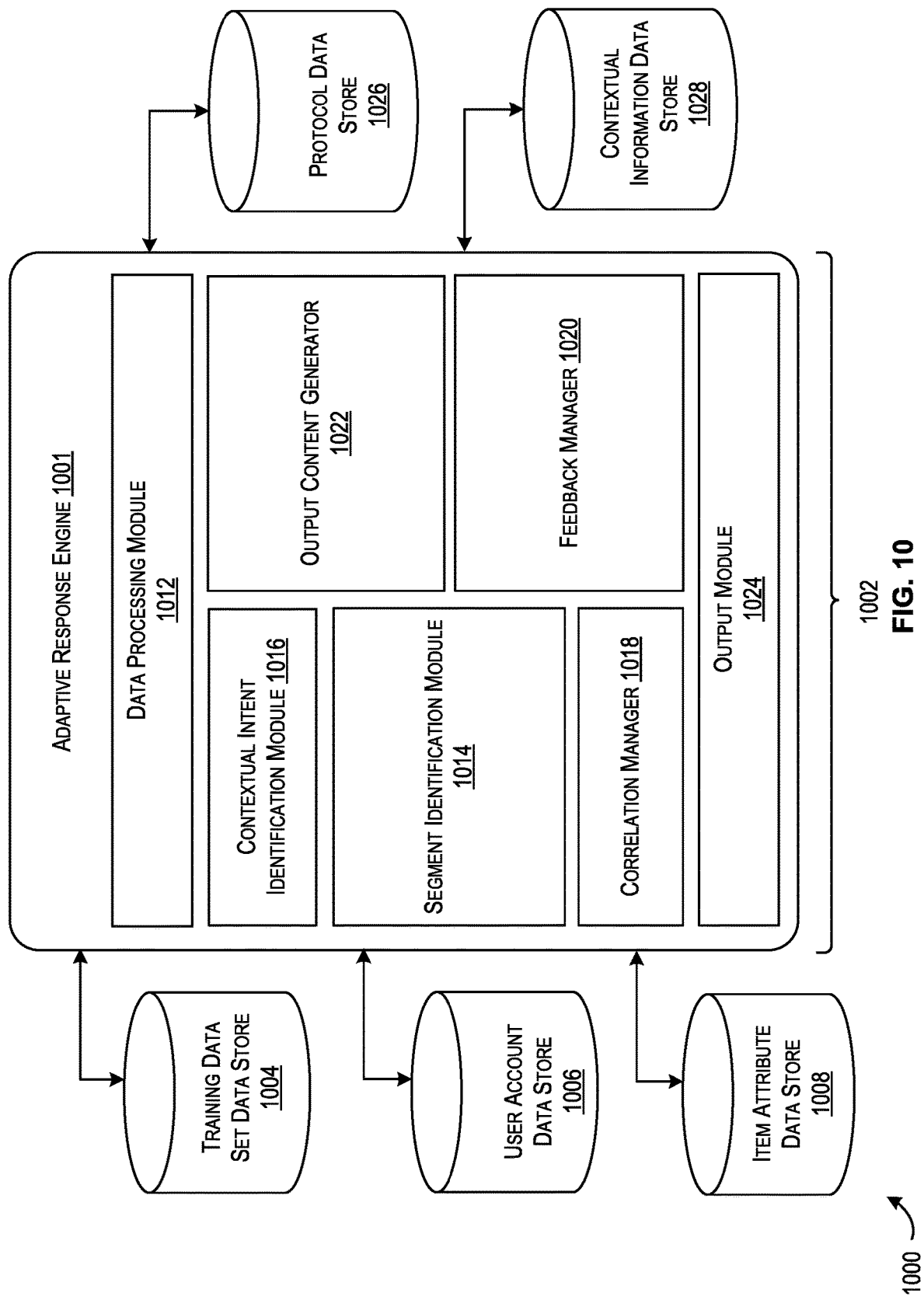
FIG. 10 is a schematic diagram of an example computer architecture for the adaptive response engine, including a plurality of modules that may perform functions in accordance with at least one embodiment.

FIG. 10 is a schematic diagram of an example computer architecture 1000 for the adaptive response engine 1001 (e.g., an example of the adaptive response engines 102, 202, and 302 of FIGS. 1-3), including a plurality of modules 1002 that may perform functions in accordance with at least one embodiment. The modules 1002 may be software modules, hardware modules, or a combination thereof. If the modules 1002 are software modules, the modules 1002 can be embodied on a computer readable medium and processed by a processor in any of the computer systems described herein. It should be noted that any module or data store described herein, may be, in some embodiments, be a service responsible for managing data of the type required to make corresponding calculations. The modules 1002, or some portion of the modules 1002, may be operate at the service provider computer(s) 910 of FIG. 9, or the modules may operate as separate modules or services external to the service provider computer(s) 910 (e.g., as part of the application 906 of FIG. 9 operating on the user device(s) 904 of FIG. 9).

In the embodiment shown in the FIG. 10, a training data set data store 1004, a user account data store 1006, an item attribute data store 1008, a protocol data store 1026, and a contextual information data store 1028 are shown, although data can be maintained, derived, or otherwise accessed from various data stores, either remote or local to the adaptive response engine 1001, to achieve the functions described herein. In at least one embodiment, the data stores described herein may be physically located on the user device(s) 904 or alternatively, any suitable combination of the data stores may be operated as part of the service provider computer(s) 910, for example, as part of the adaptive response engine 1001. The adaptive response engine 1001, as shown in FIG. 10, includes various modules such as a data processing module 1012, a contextual intent identification module 1016, a segment identification module 1014, a correlation manager 1018, a feedback manager 1020, and an output module 1024 are shown. Some functions of the modules 1002 are described below. However, for the benefit of the reader, a brief, non-limiting description of each of the modules is provided in the following paragraphs.

In at least one embodiment, the adaptive response engine 1001 includes the data processing module 1012. Generally, the data processing module 1012 may be utilized to receive any suitable information with respect to any example provided herein. The data processing module 1012 may include any suitable number of application programming interfaces with which the functionality of the adaptive response engine 1001 may be invoked. In some embodiments, the data processing module 1012 may be configured to receive potential training set data (e.g., training data set 404, 424, and/or 444 of FIGS. 4A-4C and/or any suitable training data set discussed herein). The data processing module 1012 may be configured to store the potential training data in training data set data store 1004.

The adaptive response engine 1001 may include a segment identification module 1014. The functionality of the segment identification module 1014 may be invoked by the data processing module 1012. By way of example, upon receiving potential training data, the data processing module 1012 may invoke (e.g., execute a function call to invoke) the functionality of segment identification module 1014.

In some embodiments, the segment identification module 1014 may be configured to train and/or maintain a segmentation model (e.g., the title segment model 401 of FIG. 4A, the significant segment model 421 of FIG. 4B, or any suitable segment model for identifying segments from input data (e.g., a title, user input, historical account data) as discussed herein). The segment identification module 1014 may be configured to perform the processes 400A and 400B discussed above. In some embodiments, segment identification module 1014 may be configured to perform a method to train the significant segment model 611 of FIG. 6. The segment identification module 1014 may obtain the training data set from the training data set data store 1004 and/or by soliciting feedback from a group of crowdsource users via a crowdsourcing platform.

In some embodiments, the segment identification module 1014 may invoke the functionality of the feedback manager 1020. The feedback manager 1020 may be configured to host and/interface with a crowdsourcing platform to obtain training data set information from any suitable number of users. In some embodiments, the feedback manager 1020 may present via an interface it hosts, or provide to the crowdsourcing platform to present any suitable crowdsource user interface discussed above in connection with FIGS. 4A-4B to solicit feedback including, but not limited to, identifying segments from input data and/or identifying significant segments from a set of segments. In general, the feedback manager 1020 may be configured to execute any suitable combination of evaluation procedures 412 and/or of FIGS. 4A and 4B.

It should be appreciated that the various forms of training data discussed herein may be stored in separate containers or a common container. For example, the training data 404 may be separate or combined with the training data set 424 and/or the training data set 444.

Item titles may often be structured differently than ordinary sentences (e.g., sentences). For example, item titles may often include a sequence of noun phrases without any verbs. Additionally, item titles may often utilize punctuation marks and/or symbols differently than typically used in a sentence. In some embodiments, models trained by the segment identification module 1014 may utilize punctuation marks and/or symbols found in the input data and/or the segment identification module 1014 may utilize a list of predetermined tokens that typically identify the beginning and/or some portion of a segment (or that indicate a relation to an attribute type), a list of predetermined regular expressions that typically identify the beginning and/or some portion of a segment (or that indicate a relation to an attribute type) to identify segments (and in some cases, attribute type) from input data. In some embodiments, the segment identification module 1014 may similarly use another predefined list of tokens (e.g., words), phrases, and/or regular expressions to identify when a segment relates to a given attribute type (e.g., a brand, a product type, etc.).

In some embodiments, the segmentation model maintained by the segment identification module 1014 may be a feed forward artificial neural network with one hidden layer atop of a trainable embedding layer. A feed forward neural network may be an artificial neural network wherein connections between the nodes in the neural network do not form a cycle. In this type of neural network, the information moves in only one direction, forward, from node to node. In some embodiments, the segmentation model may identify a subset of the input data (e.g., at most 5 tokens in the order in which they appear in the title). The segmentation model may evaluate the tokens to identify whether a center token opens a segment or not. In some embodiments, the subset of input data may change according to a sliding window. For example, a 5 token window may be utilized, although other window sizes are contemplated. A first evaluation may include 2 special symbols in the first and second positions of the window, followed by the first token in the title, the second token in the title, and a third token in the title, respectively. A second evaluation may occur for the second token in the title using a window including a symbol denoting a padded value, the first token in the title, followed by the second, third, and fourth tokes of the title, respectively. The window may be moved at each evaluation until all tokens in the title have been evaluated. The last evaluation may be of token 5 and the window may include token 3, token 4, token 5, following by two special symbols indicating padded values. In this manner, each token (e.g., word) of the input data may be evaluated and labeled according to at least some of the surrounding tokens (e.g., some tokens that precede the token in the title and/or some tokens that subsequently occur in the title).

In some embodiments, the evaluation procedures 412 and/or 432 may occur at any suitable time as new training data is generated. By way of example, as the segmentation model identifies subsequent segments and/or attribute types of a title, this new data may be stored by the segment identification module 1014 in the training data set data store 1004 and filtered as described above to form an updated version of the training data set. Periodically and/or according to a schedule, the segment identification module 1014 may be configured to retrain the segmentation model utilizing the updated version of the training data.

Part of the evaluation procedure 212 may include querying one or more crowdsourcing platform users to identify whether a set of segments and/or an attribute type for a given title have been accurately identified. In some embodiments, segment identification module 1014 may stimulate these operations by invoking the functionality of the feedback manager 1020 and/or the feedback manager 1020 may be configured to perform these operations according to any suitable periodicity, frequency, and/or schedule. The feedback manager 1020 may provide any suitable interface (and/or provide any suitable data to the crowdsourcing platform) to solicit feedback from the crowdsourcing platform users. In some embodiments, the feedback may indicate one or more reasons the segmentation and/or attribute type was inaccurate. This feedback may be utilized to retrain the segmentation model to more accurately identify input data going forward.

It should be appreciated that the operations performed to train the segmentation model may be performed as part of a preprocessing procedure, or at least prior to utilizing the segmentation model to identify output for a response to received user input.

In some embodiments, the data processing module 1012 may be configured to receive input data (e.g., user input 106 of FIG. 1) may be obtained at a user device (e.g., the user device 108, the user device(s) 904 of FIG. 9). As a non-limiting example, a user of the user device may speak a command/statement/question which can be can be received as sound input by an input device (e.g., a microphone) of the user device. Although sound data/vocal input are used in a variety of examples herein, it should be appreciated that similar techniques may be utilized using data of other formats (e.g., textual data) via the user submitting the input data via another suitable input device (e.g., a keyboard). In some embodiments, the data processing module 1012 may convert the input data to text at any suitable time utilizing any suitable speech-to-text algorithm.

In some embodiments, the data processing module 1012 may invoke the functionality provided by the contextual intent identification module 1016. The contextual intent identification module 1016 may be configured to identify a contextual intent for the input data received from the data processing module 1012. For example, the input data may include content indicative of an attempt to purchase an item, a task which may be associated with a buy intent (a type of contextual intent). To identify the contextual intent of the input data, the contextual intent identification module 1016 may tokenize to separate the input data into tokens (words, numbers, and/or phrases). The contextual intent identification module 1016 may be configured to utilize any suitable lexical analysis algorithm to identify these tokens. In some embodiments, a contextual protocol set (e.g., one or more predetermined rules) may be utilized to determine the contextual intent of the input data based at least in part on these tokens (e.g., words) and/or combinations of tokens (e.g., phrases). By way of example, the contextual protocol set (or contextual protocol for brevity) may specify particular words, phrases, regular expressions and the like as being associated with (e.g., mapped) to a particular contextual intent (e.g., a buy intent, a cancel order intent, a reorder intent, etc.). The contextual intent identification module 1016 may identify input data as having a particular type of contextual intent when the input data includes over a threshold number of words/phrases/regular expressions associated with the particular type of contextual intent (or at least more than it contains of words/phrases/regular expressions associated with one or more other contextual intents). The contextual intent identification module 1016 may be configured to store any suitable data related to the input data such as the input data itself and the contextual intent identified for the input data in the contextual information data store 1028. Any functionality performed by the contextual intent identification module 1016 may be specified and driven by one or more predetermined contextual intent protocols (e.g., rules) that may be stored in the contextual information data store 1028 and accessible to the contextual intent identification module 1016. Thus, the functionality described above as being performed by the contextual intent identification module 1016 may be performed in accordance with the contextual intent protocol(s) obtained from the contextual information data store 1028.

In some embodiments, the data processing module 1012 may identify an item based at least in part on some portion of the input data and item attribute information stored in item attribute data store 1008. Item attribute data store 1008 may contain attributes associated with any suitable number of items (e.g., items offered in an electronic catalog). By way of example, the data processing module 1012 may generate a query (e.g., query 118 derived from user input 106 of FIG. 1) and utilize the query (and any suitable search engine technique) to identify one or more items corresponding to the query. In some embodiments, the searching technique for identifying the one or more items corresponding to the query may utilize any suitable portion of the data stored in the item attribute data store 1008 and/or any suitable information (e.g., historical purchase history, browsing history, reoccurring orders/subscriptions) stored in the user information data store 1006 and associated (e.g., via a user account) with the user and/or a group of users of the electronic catalog.

Upon identifying an item, the data processing module 1012 may obtain a particular attribute of the item, such as the item title and may submit the item title to the segment identification module 1014 (or to the segmentation model directly if stored in a storage location accessible to the data processing module 1012) to identify one or more segments of the item title (and, in some cases, one or more attribute types for at least some of the respective segments). The segmentation identification module 1014 may be configured to manage and maintain one or more segmentation models (e.g., the title segment model 401 of FIG. 4A, the significant segment model 421 of FIG. 4B). In some embodiments, the segment identification module 1014 may be configured to identify one or more segments of an item title offline and associated the identified segments with the item (e.g., as an association to an identifier for the item). Thus, in some embodiments, the segment identification module 1014 may retrieve the title segments from this association without having to provide the title to a machine-learning model at run time. In some embodiments, the data processing module 1012 may store any suitable attribute of the item (e.g., the title), one or more tokens and/or token indexes (identified by the segment identification module 1014), one or more segments identified by the segment identification module 1014, one or more attribute types associated with a given segment, the input data to which the item relates, the contextual intent identified for the input data by the contextual intent identification module 1016, or the like. In some embodiments, this information may be stored in the contextual information data store 524.

In some embodiments, the segment identification module 1014 may be configured to identify any suitable number of significant segments from historical user data and/or user input (e.g., the user input 106 of FIG. 1). For example, the segment identification module 1014 may utilize the significant segment model 421 to identify significant segments from user input, historical user data, item attributes of items that the user has previously interacted with, previous user input, and the like. In some embodiments, the segment identification module 1014 may be configured to determine a significance score (which may be part of the output provided by the significant segment model 421) for each significant segment. In some embodiments, the segment identification module 1014 may score each significant segment based at least in part on a predefined rule set. The identification of the significant segments and/or the significant segment scores may be performed during runtime or as part of an offline process conducted prior to runtime. In still other embodiments, the segment identification module 1014 may be configured to identify every segment of user input as being a significant segment.

In some embodiments, the correlation manager 1018 may be configured to execute any suitable operations discussed in connection with FIG. 4C for identifying correlations between title segments and a set of significant segments (e.g., title segments and/or significant segments identified by the segment identification module 1014). The correlation manager 1018 may be configured to generate and store indicators that indicate which title segments were identified as correlating to at least one of the significant segments of the input data. The correlation manager 1018 may be configured to perform any suitable operations discussed above in connection with the evaluation procedure 452 of FIG. 4C at any suitable time.

In some embodiments, the output content generator 1022 may be configured to select one or more segments from the segment(s) identified by the model based on the contextual intent of the input data. By way of example, the output content generator 1022 may be configured to perform the method 800 of FIG. 8. In some embodiments, the output content generator 1022 may maintain a mapping that identifies associations between a particular contextual intent and a particular type of shortened title. Each type of shortened title may be associated with a corresponding set of rules (e.g., a subset of rules of a selection protocol) that specifies the manner in which particular segments are to be selected (e.g., and/or to generate a shortened title) from a set of title segments. A number of example selection protocol are discussed above in connections with FIG. 3. In some embodiments, the adaptive response engine may generate a shortened title from the set of title segment(s) and in accordance with one or more rules of the selection protocol (e.g., particular segments related to particular item features are to be selected and arranged in a particular order, etc.). Any suitable number of selection protocols may be stored within the selection protocol data store and accessible to the output content generator 1022.

The output content generator 1022 may be configured to obtain a segment selection protocol from the selection protocol data store 1026. A segment selection protocol (also referred to as a "selection protocol set" or "segment selection protocol") may identify a set of rules for segment selection. In some embodiments, the output content generator 1022 may consult a predefined mapping (e.g., stored in the selection protocol data store 1026) that maps contextual intents (e.g., buy intent, reorder intent, cancel intent, etc.) to an identifier for the segment selection rules to be utilized for segment selection (e.g., "long title rules," "short title rules," "medium title rules," etc.). There can be any suitable number of segment selection rules corresponding to any suitable number of contextual intents that may be used for segment selection.

By way of example, the mapping may indicate that input data identified as having the contextual intent to buy an item (e.g., buy intent) is to utilize segment selection rules (e.g., rules corresponding to selecting segment based on generating a long title, a first set of segment selection rules, etc.), while input data that is identified as having a different contextual intent (e.g., reorder intent, cancel intent, etc.) is to utilize another set of segment selection rules (e.g., a set of rules that differ from the first set of segment selection rules above, a set of rules for segment selection for generating a medium title, or yet another set of rules for segment selection to be used for generating a short title, etc.). It should be appreciated that terms "long," "short," and "medium" discussed with respect to an item title may refer to a particular title length (e.g., as measured in words, terms, tokens, segments, etc.) and/or the terms "long," "short," and "medium," among others, may refer to the selection protocol to be utilized. Several example segment selection protocols are provided above in connection with FIG. 8. In some embodiments, the segment selection protocols may utilize any suitable ranking, priority, and/or significance score associated with a significant segment when determining which particular title segment(s) to select. That is, in some embodiments, one or more title segment(s) corresponding to significant segments with higher significance score(s) (e.g., a highest significance score, over a threshold value, a particular number of significant segments having the highest significant scores, etc.) may be selected according to the segment selection protocols.

In some embodiments, the output content generator 1022 may be configured to execute a particular segment selection protocol on input data to select one or more segments of the input data and/or receive a shortened version comprising one or more segments. In some embodiments, the output content generator 1022 may be configured to generate a shortened title from the one or more segments selected utilizing the title and the segment selection protocol. In some embodiments, the output content generator 1022 may be configured to execute a default segment selection protocol should executing a first segment selection protocol fail to provide a set of selected segments and/or shortened title. In some embodiments, an indication of the selected segments of an instance of input data (and/or a shortened title generated from those selected segments) may be stored in any suitable storage location (e.g., as part of the data stored in the training data set data store 1004, as part of the data stored in the contextual information data store 1028).

The output module 1024 may be configured to generate output (e.g., response 136 of FIG. 1) corresponding to the input data based at least in part on the content of the input data and any suitable data identified by any suitable combination of the modules 1002. In some embodiments, the output module 1024 may utilize one or more of the selected title segments and/or shortened title generated by the output content generator 1022 to generate the output. The particular output generated may be based on a number of predefined rules. In some embodiments, these rules may cause the output to utilize all or some portion of the segments identified for the item corresponding to the input data to be utilized in the output. In some embodiments, these rules may identify which segments are to be utilized by specifying an attribute type (e.g., segments associated with brand, segments associated with product type, etc.). In some embodiments, the selected segments may be utilized in the sequence originally provided by the input data or the output module 1024 may rearrange the segments according to the output generation rules. In some embodiments, the output module 1024 may be configured to convert the output to audio output utilizing any suitable text-to-speech algorithm discussed herein. The audio output (and/or the textual version of the output) may be presented (e.g., by the adaptive response engine 1001) at a user device via an application hosted by the adaptive response engine 1001 (e.g., the application 906 of FIG. 9).

It should be appreciated that although examples provided herein utilize a user request as a triggering event to execute the functionality of the adaptive response engine 1001, such functionality may be triggered using different data. By way of example, the functionality of the adaptive response engine 1001 (and/or the modules 1002) may be provided as a software service assessable via one or more application programming interfaces and/or function calls. Accordingly, it may be the case that a user request may be considered to be information received via an application programming interface and/or function call. By way of example, any suitable system may request a shortened title for an item. In some embodiments, the request may specify a selection protocol and/or a type of shortened title requested (e.g., "long," "short," "medium"). In some embodiments, the request may further include one or more default selection protocols or types of shortened titles requested should the first selection protocol fail to produce a shortened title. Accordingly, in some examples, contextual intent of the request need not be ascertained as the intent (e.g., requesting a title according to a particular selection protocol/order of protocols) has already been specified in the request.

As a non-limiting example, a system or process responsible for notifying a user of information (e.g., delivery notification) may request a shortened title for one or more items (e.g., items to be referenced in the deliver notification) with respect to a particular user. For example, the title of an item may include "Coffee, 2 lbs. bag, whole beans, $12.99." The system may request a shortened title by providing the title or an identifier of the item with which the item attributes (e.g., the item title) may be retrieved. The requestor may further include an indicator indicating a request for a shortened title of a particular type (e.g., a "short title"). The item title may be utilized by the output content generator 1022 to select a number of title segments according to a selection protocol associated with the type of shortened title requested. If a shortened title is obtained using the selection protocol, the shortened title may be returned to the requesting system, enabling that system to provide the user a notification indicating "your coffee has arrived" when it detects the delivery of a package associated with the item has been delivered.

It should also be appreciated that in the examples provided above a single item may be utilized. However, it should be appreciated that a request (e.g., from a user, from another system or computing device, etc.) may relate to multiple items and the adaptive response engine 1001 may be utilized to generate shortened titles for each item in the manner discussed herein. As a non-limiting example, a user may ask "what are the deals today?" A query may be generated from that request and a number of items associated with discounted prices may be returned. In some embodiments, the request may be identified as being associated with a "deals intent." Accordingly, a shortened title may be generated for each item using a particular selection protocol for each title. Thus, the user may be presented with output such as "today's deals include Bluetooth Headphones, Brand X Coffee, Vegan cookies, a headlamp, and more."

Thus, by utilizing the techniques discussed herein, the user's experience is improved by tailoring the output to provide enough information to be informative given the particular context, to ensure that significant terms and/or features typically preferred by or provided by a user are utilized to generate the output, and to provide clarity, without inundating the user with superfluous information that may confused or annoy the user or cause confusion as to the meaning of the output provided to the user.

Figure 11:
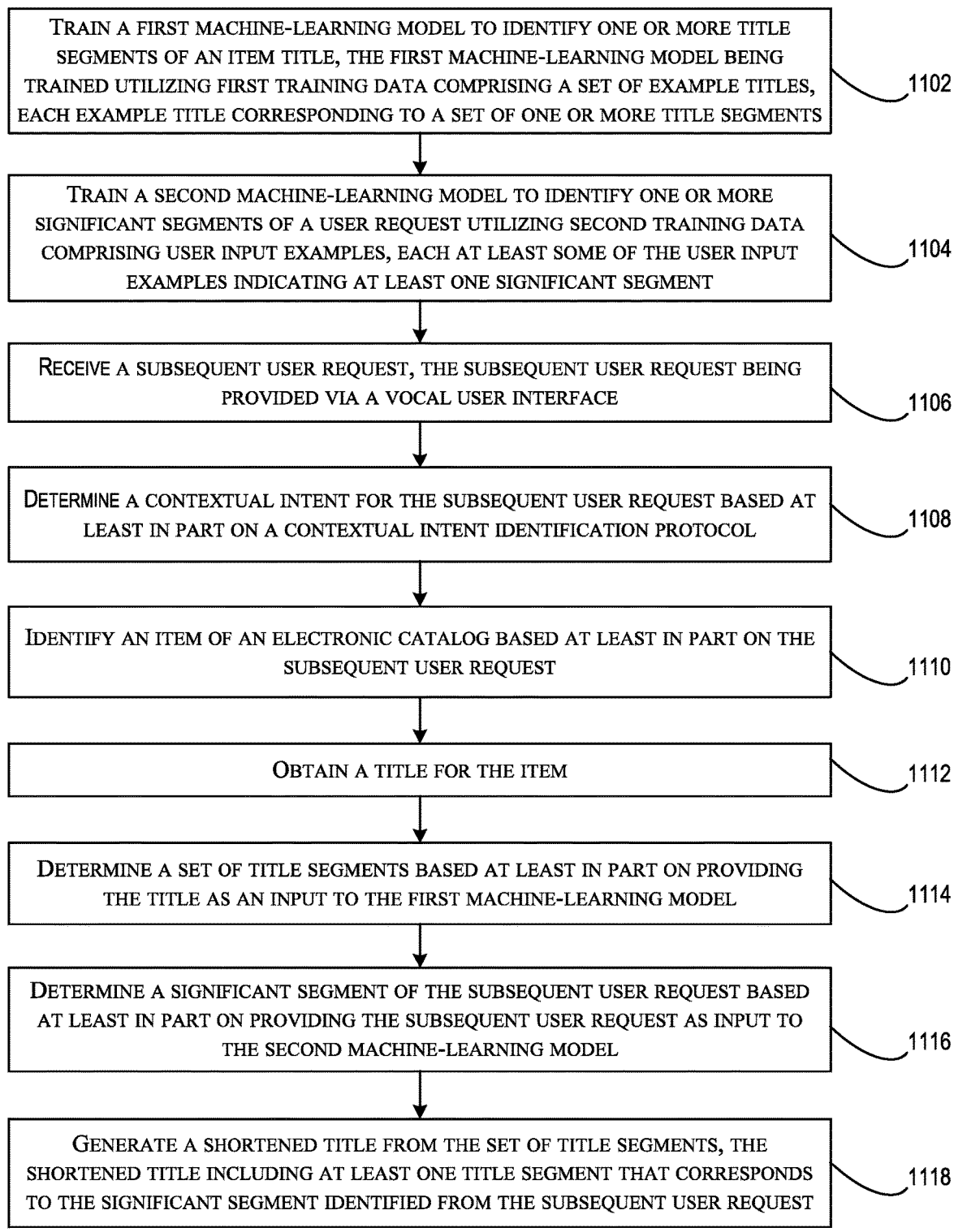
FIG. 11 includes a flowchart illustrating an example method for generating a shortened title for an item utilizing an adaptive response engine, in accordance with at least one embodiment.

FIG. 11 is a flowchart illustrating an example method 1100 for generating a shortened title for an item utilizing an adaptive response engine (e.g., the adaptive response engines of FIGS. 1-3, 9, and 10), in accordance with at least one embodiment. A computer-readable medium may store computer-executable instructions that, when executed by at least one processor, cause at least one computer to perform instructions comprising the operations of the method 1100. It should be appreciated that the operations of the method 1100 may be performed in any suitable, not necessarily the order depicted in FIG. 11. Further, the method 1100 may include additional, or fewer operations than those depicted in FIG. 11. The operations of method 1100 may be performed by a computing system (e.g., the adaptive response system 900) comprising the adaptive response engine 1001 of FIG. 10 which may operate in whole or in part on a user device (e.g., one or more of the user device(s) 904 of FIG. 9) and/or the service provider computer(s) 910 of FIG. 9.

The method 1100 may begin at 1102, where a first machine-learning model (e.g., the title segment model 401 of FIG. 4A) may be trained (e.g., by the segment identification module 1014 of FIG. 10) to identify one or more title segments of an item title. In some embodiments, the first machine-learning model may be trained utilizing first training data comprising a set of example titles, each example title corresponding to a set of one or more title segments. The set of one or more title segments may be predefined and/or obtained from a set of crowdsource users. It should be appreciated that the first machine-learning model may be trained prior to runtime.

At 1104, a second machine-learning model (e.g., the significant segment model 421 of FIG. 4B) may be trained (e.g., by the segment identification module 1014) to identify one or more significant segments of a user request (e.g., user input) utilizing second training data comprising user input examples. In some embodiments, at least some (e.g., one or more) of the user input examples indicate at least one significant segment. In some embodiments, the second machine-learning model could be trained to identify significant segments from any suitable user input and/or historical user data. It should be appreciated that the second machine-learning model may be trained prior to runtime.

At 1106, a subsequent user request may be received (e.g., by the data processing module 1012). In some embodiments, the subsequent user request (e.g., the user input 106 of FIG. 1) may be provided via a vocal user interface. The data processing module 1012 and/or the user device from which the user request was received (e.g., the user device 108 of FIG. 1) may be configured to convert the user request initially received as vocal input to textual format utilizing any suitable speech-to-text algorithm.

At 1108, a contextual intent for the subsequent user request may be determined (e.g., by the contextual intent identification module 1016) based at least in part on a contextual intent identification protocol. In some embodiments, the contextual intent identification protocol may identify a set of predetermined words, phrases, and/or regular expressions as being indicative of a particular contextual intent. Accordingly, if the contextual intent identification module 1016 identifies the user request includes one or more of these words/phrases/regular expressions, the user request may be determined to have a contextual intent corresponding to the contextual intent associated with those words/phrases/regular expressions.

At 1110, an item of an electronic catalog may be identified (e.g., by the data processing module 1012) based at least in part on the subsequent user request. By way of example, a query may be derived from the user request (e.g., text representing the user's spoken words) and utilized with any suitable search engine algorithm to identify one or more items to which the query relates.

At 1112, a title for the item may be obtained (e.g., by the data processing module 1012). By way of example, a title for the item (e.g., an attribute of the item as stored in the electronic catalog) may be retrieved (e.g., from attributes stored in the item attribute data store 1008).

At 1114, a set of one or more title segments may be determined (e.g., by the segment identification module 1014) based at least in part on providing the title as an input to the first machine-learning model (e.g., the title segment model 401 of FIG. 4A). It should be appreciated that determining the set of one or more title segments may be determined as part of an offline process executed prior to runtime or at runtime.

At 1116, a significant segment (at least one significant segment) of the subsequent user request may be determined (e.g., by the segment identification module 1014) based at least in part on providing the subsequent user request as input to the second machine-learning model.

At 1118, a shortened title may be generated (e.g., by the output content generator 1022 of FIG. 10) from the set of title segments. In some embodiments, the shortened title may include at least one title segment that corresponds to the significant segment identified from the subsequent user request. The shortened title may be generated according to a selection protocol associated with the contextual intent identified by the contextual intent identification module 1016. In some embodiments, the shortened title may be provided (e.g., by the output module 1024) as output in response to the subsequent user request.

Figure 12:
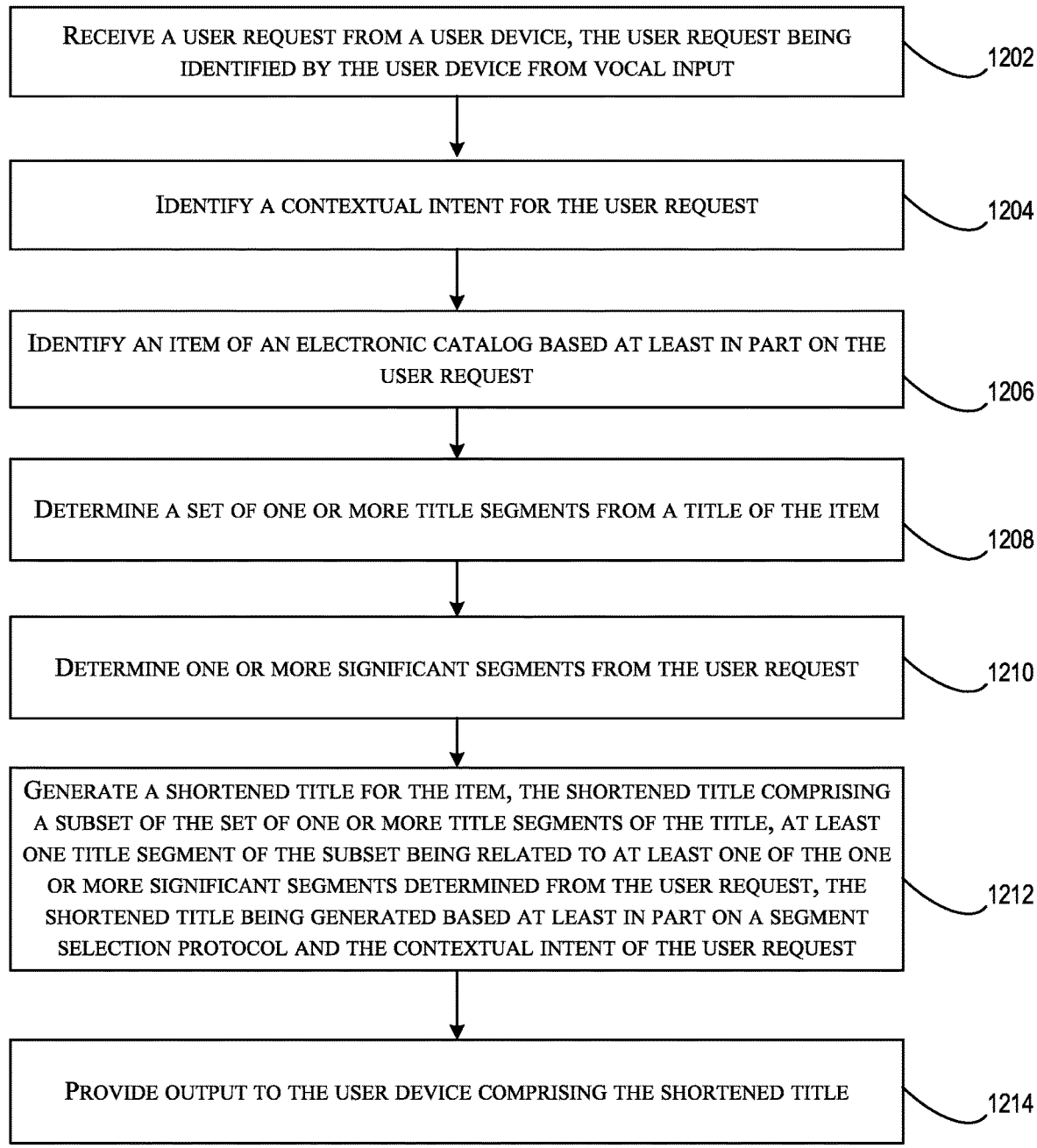
FIG. 12 includes another flowchart illustrating another example method for generating a shortened title for an item utilizing an adaptive response engine, in accordance with at least one embodiment.

FIG. 12 is another flowchart illustrating another example method 1200 for generating a shortened title for an item utilizing an adaptive response engine (e.g., the adaptive response engines of FIGS. 1-3, 9, and 10), in accordance with at least one embodiment. A computer-readable medium may store computer-executable instructions that, when executed by at least one processor, cause at least one computer to perform instructions comprising the operations of the method 1200. It should be appreciated that the operations of the method 1200 may be performed in any suitable, not necessarily the order depicted in FIG. 12. Further, the method 1200 may include additional, or fewer operations than those depicted in FIG. 12. The operations of method 1200 may be performed by any suitable combination of the modules 1002 of the adaptive response engine 1001 of FIG. 10 which may operate in whole or in part on a user device (e.g., one or more of the user device(s) 904 of FIG. 9) and/or the service provider computer(s) 910 of FIG. 9. As a non-limiting example, the method 1200 may be performed by a computing device (e.g., the service provider computer(s) 910) having one or more processors and a memory storing executable instructions that, upon execution by the one or more processors, cause the computing device to perform at least the operations of method 1200.

The method 1200 may begin at 1202, where a user request may be received from a user device. In some embodiments, the user request (e.g., user input 106 of FIG. 1) may be received by the data processing module 1012 of FIG. 10. In some embodiments, the user request may be received as textual input or vocal input. If the user request is received as vocal input, the data processing module 1012 (or the user device 108 of FIG. 1, an example of the user device(s) 904 of FIG. 9) may be configured to convert the speech to text utilizing any suitable speech to text algorithm.

At 1204, a contextual intent for the user request may be identified (e.g., by the contextual intent identification module 1016). In some embodiments, the contextual intent may be identified based at least in part on a contextual intent identification protocol. In some embodiments, the contextual intent identification protocol may identify a set of predetermined words, phrases, and/or regular expressions as being indicative of a particular contextual intent. Accordingly, if the contextual intent identification module 1016 identifies the user request includes one or more of these words/phrases/regular expressions, the user request may be determined to have a contextual intent corresponding to the contextual intent associated with those words/phrases/regular expressions.

At 1206, an item of an electronic catalog may be identified (e.g., by the data processing module 1012) based at least in part on the user request. By way of example, a query may be derived from the user request (e.g., text representing the user's spoken words) and utilized with any suitable search engine algorithm to identify one or more items to which the query relates.

At 1208, a set of one or more title segments may be determined (e.g., by the segment identification module 1014) from a title of the item. In some embodiments, the title of the item may be provided to a machine-learning model (e.g., the title segment model 401 of FIG. 4A) that has been previously trained (e.g., by the segment identification module 1014) to identify title segments from an input title. It should be appreciated that determining the set of one or more title segments may be identified as part of an offline process executed prior to runtime or at runtime.

At 1210, a set of one or more significant segments may be determined (e.g., by the segment identification module 1014) from the user request. In some embodiments, the user request (text representing the user's spoken words) may be provided to a machine-learning model (e.g., the title segment model 401 of FIG. 4A) that has been previously trained (e.g., by the segment identification module 1014) to identify title segments from an input title.

At 1212, a shortened title may be generated (e.g., by the output content generator 1022 of FIG. 10). In some embodiments, the shortened title may include a subset of the set of one or more title segments. In some embodiments, at least one title segment of the subset being related to at least at least one of the one or more significant segments determined from the user request. The shortened title being generated (e.g., by the contextual intent identification module 1016) based at least in part on a segment selection protocol and the contextual intent of the user request.

At 1214, the shortened title may be provided (e.g., by the output module 1024) as output (e.g., response 136 of FIG. 1) in response to the subsequent user request.

Figure 13:
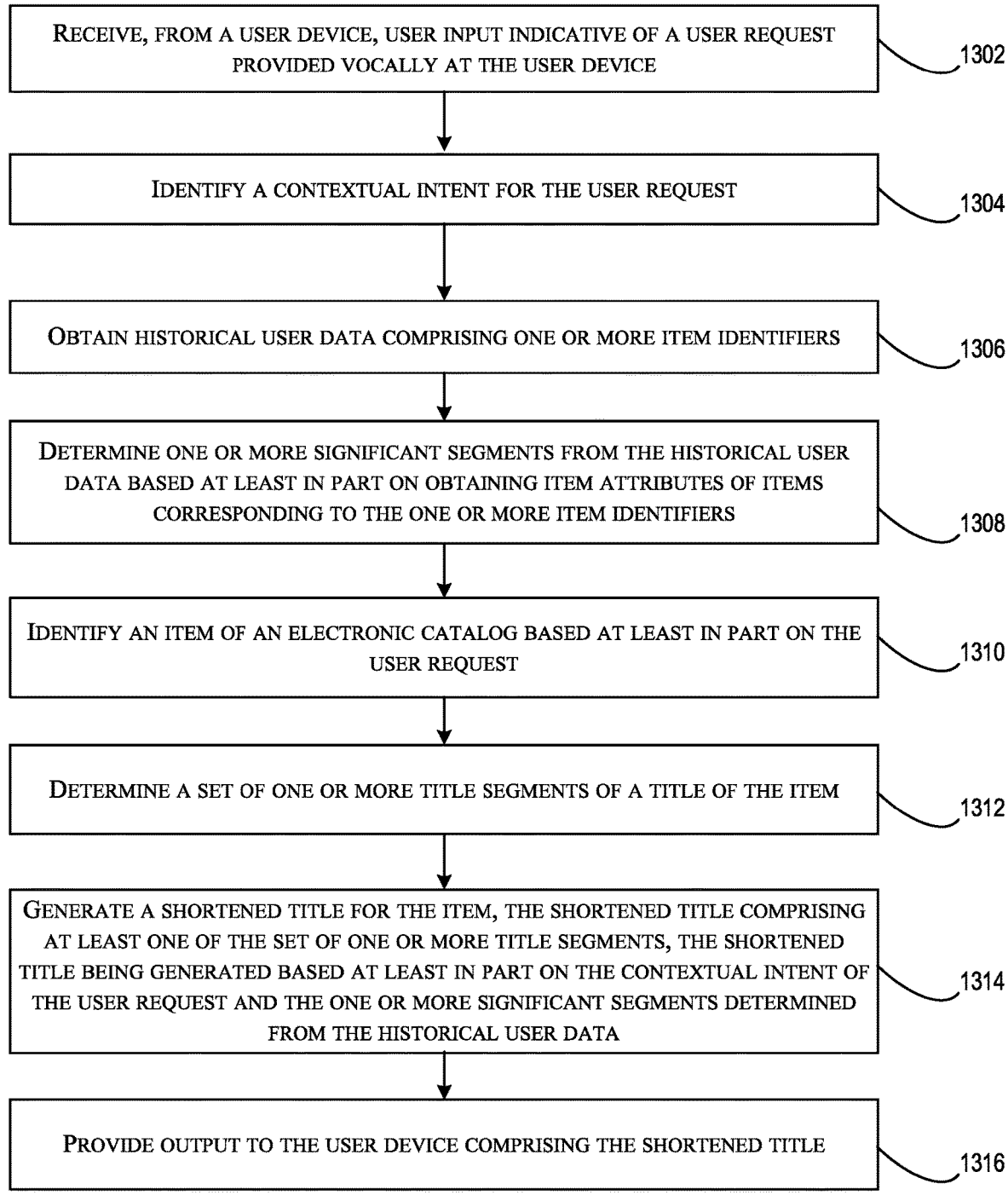
FIG. 13 includes yet another flowchart illustrating yet another example method for generating a shortened title for an item utilizing an adaptive response engine, in accordance with at least one embodiment.

FIG. 13 is yet another flowchart illustrating yet another example method 1300 for generating a shortened title for an item utilizing the adaptive response engine (e.g., the adaptive response engines of FIGS. 1-3, 9, and 10), in accordance with at least one embodiment. A computer-readable medium may store computer-executable instructions that, when executed by at least one processor, cause at least one computer to perform instructions comprising the operations of the method 1300. It should be appreciated that the operations of the method 1300 may be performed in any suitable, not necessarily the order depicted in FIG. 13. Further, the method 1300 may include additional, or fewer operations than those depicted in FIG. 13. The operations of method 1300 may be performed by any suitable combination of the modules 1002 of the adaptive response engine 1001 which may operate in whole or in part on a user device (e.g., one or more of the user device(s) 904 of FIG. 9, which may be examples of the user devices 108, 208, and 308 of the FIGS. 1-3) and/or the service provider computer(s) 910 of FIG. 9.

The method 1300 may begin at 1302, where a user request may be received from a user device. In some embodiments, the user request (e.g., user input 106 of FIG. 1) may be indicative of a user request provided vocally at the user device. The user request may be received by the data processing module 1012 of FIG. 10. In some embodiments, the user request may be received as textual input or vocal input. If the user request is received as vocal input, the data processing module 1012 (or the user device 108 of FIG. 1, an example of the user device(s) 904 of FIG. 9) may be configured to convert the speech to text utilizing any suitable speech to text algorithm.

At 1304, a contextual intent for the user request may be identified (e.g., by the contextual intent identification module 1016). In some embodiments, the contextual intent may be identified based at least in part on a contextual intent identification protocol. In some embodiments, the contextual intent identification protocol may identify a set of predetermined words, phrases, and/or regular expressions as being indicative of a particular contextual intent. Accordingly, if the contextual intent identification module 1016 identifies the user request includes one or more of these words/phrases/regular expressions, the user request may be determined to have a contextual intent corresponding to the contextual intent associated with those words/phrases/regular expressions.

At 1306, historical user data comprising one or more item identifiers may be obtained (e.g., from the user account data store 1006). The historical user data may item identifiers obtained from purchase history, browsing history, shopping cart history or any suitable data associated with a user account.

At 1308, a set of one or more significant segments may be determined (e.g., by the segment identification module 1014) from the historical user data. Item attributes (or any suitable item information including item attributes, reviews, question and answers, etc.) may be obtained with the one or more item identifiers from the item attribute data store 1008. In some embodiments, the item information may be provided to a machine-learning model trained and maintained by the segment identification module 1014 to identify significant segments from item information. that has been previously trained (e.g., by the segment identification module 1014) to identify title segments from an input title. It should be appreciated that determining the set of one or more significant segments from the historical user data may be performed as part of an offline process executed prior to runtime or at runtime.

At 1310, an item of an electronic catalog may be identified (e.g., by the data processing module 1012) based at least in part on the user request. By way of example, a query may be derived from the user request (e.g., text representing the user's spoken words) and utilized with any suitable search engine algorithm to identify one or more items to which the query relates.

At 1312, a set of one or more title segments may be determined (e.g., by the segment identification module 1014) from a title of the item. In some embodiments, the title of the item may be provided to a machine-learning model (e.g., the title segment model 401 of FIG. 4A) that has been previously trained (e.g., by the segment identification module 1014) to identify title segments from an input title. It should be appreciated that determining the set of one or more title segments may be performed as part of an offline process executed prior to runtime or at runtime.

At 1314, a shortened title may be generated for the item (e.g., by the output content generator 1022 of FIG. 10). In some embodiments, the shortened title may comprise at least one of the set of one or more title segments. In some embodiments, the shortened title may be generated based at least in part on the contextual intent of the user request and the one or more significant segments determined from the historical user data.

At 1316, the output comprising the shortened title may be provided (e.g., by the output module 1024) in response to the subsequent user request.

Figure 14:
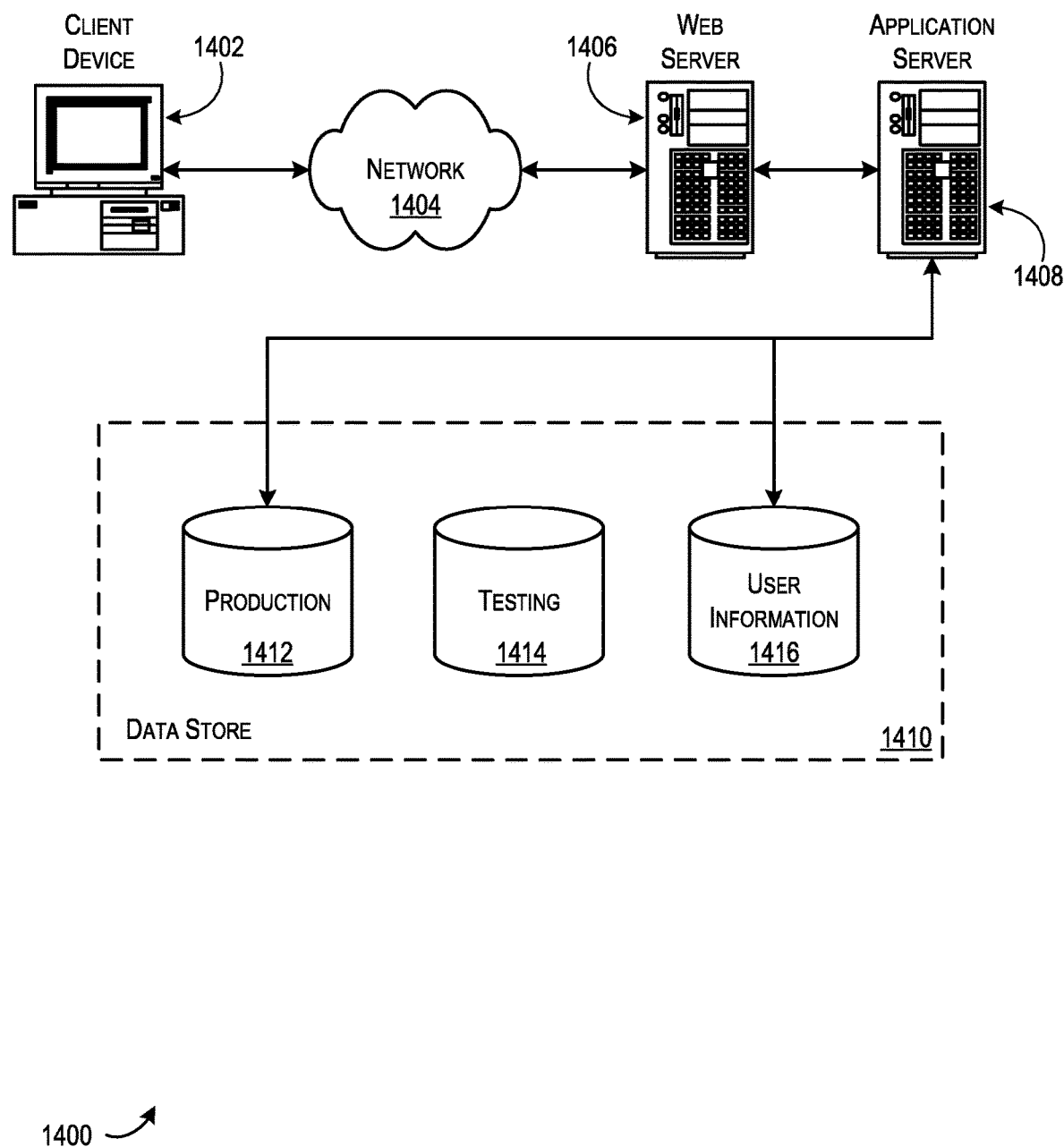
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes a user device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    training, by a computing system, a first machine-learning model to identify one or more title segments of an item title, the first machine-learning model being trained utilizing first training data comprising a set of example titles, each example title corresponding to a set of one or more title segments;
    training, by the computing system, a second machine-learning model to identify one or more significant segments of a user request utilizing second training data comprising user input examples, at least some of the user input examples indicating at least one significant segment;
    receiving, by the computing system, a subsequent user request, the subsequent user request being provided via a vocal user interface;
    determining, by the computing system, a contextual intent for the subsequent user request based at least in part on a contextual intent identification protocol;
    identifying, by the computing system, an item of an electronic catalog based at least in part on the subsequent user request;
    obtaining, by the computing system, a title for the item;
    determining, by the computing system, a set of title segments based at least in part on providing the title as an input to the first machine-learning model;
    determining a significant segment of the subsequent user request based at least in part on providing the subsequent user request as input to the second machine-learning model;
    generating, by the computing system, a shortened title from the set of title segments, the shortened title including at least one title segment that corresponds to the significant segment identified from the subsequent user request; and
    providing, by the computing system, the shortened title as output in response to the subsequent user request.

2. The computer-implemented method of claim 1, further comprising:
    receiving feedback data indicating a perceived accuracy of the second machine-learning model in determining significant segments from user requests, the feedback data being provided by a crowd-sourced group of users; and
    updating the second machine-learning model based at least in part on the feedback data.

3. The computer-implemented method of claim 1, wherein the significant segment of the subsequent user request comprises one or more words identified as being of higher significance with respect to other words of the subsequent user request.

4. The computer-implemented method of claim 1, wherein an individual title segment of the set of title segments corresponds to an attribute of the item.

5. A computing device, comprising:
one or more processors; and
a memory storing executable instructions that, upon execution by the one or more processors, cause the computing device to, at least:
receive a user request from a user device, the user request being identified by the user device from vocal input;
identify a contextual intent for the user request;
identify an item of an electronic catalog based at least in part on the user request;
determine a set of one or more title segments from a title of the item;
determine one or more significant segments from the user request based at least in part on providing the set of one or more title segments to a machine-learning model that has been previously trained to identify significant segments from title segments provided as input, the machine-learning model being trained with examples that identify at least one significant segment of an example set of title segments;
generate a shortened title for the item, the shortened title comprising a subset of the set of one or more title segments of the title, at least one title segment of the subset being related to at least one of the one or more significant segments determined from the user request, the shortened title being generated based at least in part on a segment selection protocol and the contextual intent of the user request; and
provide output to the user device comprising the shortened title.

6. The computing device of claim 5, wherein executing the instructions further causes the computing device to select particular title segments of the set of one or more title segments to generate the shortened title based at least in part on the segment selection protocol and the contextual intent for the user request, wherein the segment selection protocol specifies one or more rules for generating shortened titles from title segments.

7. The computing device of claim 6, wherein the segment selection protocol indicates a preference for including, in the shortened title, title segments corresponding to significant segments over other title segments.

8. The computing device of claim 5, wherein executing the instructions further causes the computing device to:
determine one or more related terms based at least in part on the one or more significant segments; and
correlate the at least one title segment of the set of one or more title segments to at least one of: i) the one or more significant segments identified from the user request or ii) the one or more related terms, wherein generating the shortened title comprises selecting the at least one title segment based at least in part on the correlation.

9. The computing device of claim 5, wherein generating the shortened title comprises inserting the one or more significant segments in the shortened title.

10. The computing device of claim 5, wherein generating the shortened title further depends on a length or number of the one or more significant segments.

11. The computing device of claim 5, wherein determining the one or more significant segments from the user request is based at least in part on a predetermined set of words, phrases, or regular expressions.

12. The computing device of claim 5, wherein the one or more title segments are determined from the title of the item based at least in part on at least one of: a set of predetermined punctuation symbols, a set of predetermined regular expressions, or a predetermined word set.

13. A non-transitory computer-readable storage medium having stored thereon computer-executable instructions that, when executed by a processor of a computer system, causes the computer system to perform operations comprising:
receiving, from a user device, user input indicative of a user request provided vocally at the user device;
identifying a contextual intent for the user request;
obtaining historical user data comprising one or more item identifiers;
determining one or more significant segments from the historical user data based at least in part on obtaining item attributes of items corresponding to the one or more item identifiers, the one or more significant segments being determined from the item attributes of the one or more item identifiers based at least in part on providing the item attributes to a machine-learning model that has been previously trained to identify significant segments from examples individually comprising item attributes for which significant segments are known;
identifying an item of an electronic catalog based at least in part on the user request;
determining a set of one or more title segments of a title of the item;
generating a shortened title for the item, the shortened title comprising at least one of the set of one or more title segments, the shortened title being generated based at least in part on the contextual intent of the user request and the one or more significant segments determined from the historical user data; and
provide output to the user device comprising the shortened title.

14. The non-transitory computer-readable storage medium of claim 13, wherein generating the shortened title comprises:
providing the set of one or more title segments identified from the title, the one or more significant segments determined from the historical user data, and the contextual intent to an additional selection model, the additional selection model being a previously-trained machine-learning model that has been trained to generate shortened titles based at least in part on input comprising: i) a first set of segments, ii) a second set of significant segments, and iii) a particular contextual intent; and
receiving the shortened title as output from the additional selection model.

15. The non-transitory computer-readable storage medium of claim 13, wherein determining the one or more significant segments from the historical user data is further based at least in part on identifying common attributes of items associated with the historical user data.

16. The non-transitory computer-readable storage medium of claim 15, wherein the operations further comprise determining a particular significant segment based at least in part on the user input, wherein the shortened title is generated to include a particular title segment of the set of one or more title segments based at least in part on correlating the particular title segment to at least one of: the one or more significant segments determined from the historical user data or the particular significant segment determined from the user input.

17. The non-transitory computer-readable storage medium of claim 16, wherein the operations further comprise selecting particular title segments to include in the shortened title from the set of one or more title segments based at least in part on a segment selection protocol, wherein the segment selection protocol further specifies a threshold length of the shortened title.

18. The non-transitory computer-readable storage medium of claim 17, wherein the operations for determining the one or more title segments are performed offline and the user request is provided at run time.

19. The non-transitory computer-readable storage medium of claim 18, wherein the segment selection protocol identifies a first preference to include title segments related to a first item attribute over title segments related to a second item attribute and a second preference to include title segments that correlate to significant segments of the user input over title segments related to item attributes.

* * * * *

UNITED STATES PATENT AND TRADEMARK OFFICE
CERTIFICATE OF CORRECTION

| | | |
|---|---|---|
| PATENT NO. | : 11,423,897 B1 | |
| APPLICATION NO. | : 16/777082 | |
| DATED | : August 23, 2022 | |
| INVENTOR(S) | : Ran Levy et al. | |

It is certified that error appears in the above-identified patent and that said Letters Patent is hereby corrected as shown below:

In the Claims

Column 53, Line 13, Claim 18:
Delete: "the one or more title segments are performed offline and the"
Insert – --the set of one or more title segments are performed offline and the--

Signed and Sealed this
Sixteenth Day of May, 2023

*Katherine Kelly Vidal*

Katherine Kelly Vidal
*Director of the United States Patent and Trademark Office*